United States Patent
Zhao

(10) Patent No.: US 12,519,958 B2
(45) Date of Patent: Jan. 6, 2026

(54) IMAGE PROCESSING METHOD, NON-TRANSITORY STORAGE MEDIUM AND ELECTRONIC DEVICE

(71) Applicant: GUANGDONG OPPO MOBILE TELECOMMUNICATIONS CORP., LTD., Dongguan (CN)

(72) Inventor: Juanping Zhao, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 197 days.

(21) Appl. No.: 18/374,290

(22) Filed: Sep. 28, 2023

(65) Prior Publication Data

US 2024/0022737 A1    Jan. 18, 2024

Related U.S. Application Data

(63) Continuation of application No. PCT/CN2022/078816, filed on Mar. 2, 2022.

(30) Foreign Application Priority Data

Apr. 1, 2021   (CN) .................. 202110357477.5

(51) Int. Cl.
    *H04N 19/176*   (2014.01)
    *H04N 7/01*     (2006.01)
    (Continued)

(52) U.S. Cl.
    CPC .......... *H04N 19/176* (2014.11); *H04N 7/013* (2013.01); *H04N 19/139* (2014.11); *H04N 19/177* (2014.11); *H04N 19/91* (2014.11)

(58) Field of Classification Search
    None
    See application file for complete search history.

(56) References Cited

U.S. PATENT DOCUMENTS

| | | | |
|---|---|---|---|
| 2011/0196982 A1* | 8/2011 | Chen | H04N 21/85406 709/231 |
| 2011/0249746 A1* | 10/2011 | Yang | H04N 19/00 375/240.16 |
| 2012/0106669 A1 | 5/2012 | Rao et al. | |

FOREIGN PATENT DOCUMENTS

| CN | 102063695 A | | 5/2011 |
|---|---|---|---|
| CN | 103051899 A | * | 4/2013 |

(Continued)

OTHER PUBLICATIONS

Akyol et al., "Compression-Aware Energy Optimization for Video Decoding Systems With Passive Power", IEEE Transactions on Circuits and Systems for Video Technology, IEEE, USA, vol. 18, No. 9, pp. 1300-1306, Sep. 1, 2008.

(Continued)

*Primary Examiner* — Kaitlin A Retallick
(74) *Attorney, Agent, or Firm* — Sheppard, Mullin, Richter & Hampton LLP

(57) ABSTRACT

Provided are an image processing method, an electronic device, and a non-transitory storage medium. In the method, a video bitstream is required and an initial frame rate of the video bitstream is determined. A target frame rate is determined according to a power consumption constraint instruction. To-be-decoded image frames are determined in a group of pictures of the video bitstream, according to the initial frame rate and the target frame rate. A working state of the video decoder is dynamically adjusted according to a decoding order of the to-be-decoded image frames in the group of pictures, and the to-be-decoded image frames are decoded by the video decoder based on the adjusted working state.

20 Claims, 8 Drawing Sheets

(51) Int. Cl.
　　　*H04N 19/139*　　(2014.01)
　　　*H04N 19/177*　　(2014.01)
　　　*H04N 19/91*　　(2014.01)

(56)　　　　　References Cited

FOREIGN PATENT DOCUMENTS

| | | | |
|---|---|---|---|
| CN | 104580969 | A | 4/2015 |
| CN | 104660978 | A | 5/2015 |
| CN | 108431724 | A | 8/2018 |
| JP | 2002262295 | A | 9/2002 |
| JP | 2005184519 | A | 7/2005 |
| JP | 2008034924 | A * | 2/2008 |
| JP | 2008124646 | A | 5/2008 |
| JP | 2012182723 | A | 9/2012 |
| WO | 2018082213 | A1 | 5/2018 |

OTHER PUBLICATIONS

Akyol et al., "Complexity Model Based Proactive Dynamic Voltage Scaling for Video Decoding Systems", IEEE Transactions on Multimedia, IEEE, USA, vol. 9, No. 7, pp. 1475-1492, Nov. 1, 2007.
EPO, Extended European Search Report for EP Application No. 22778453.5 dated Jul. 30, 2024.
CNIPA, First Office Action for CN Application No. 202110357477.5 dated Jul. 9, 2024.
WIPO, International Search Report for PCT Application No. PCT/CN2022/078816, May 24, 2022.

* cited by examiner

IMAGE PROCESSING METHOD, NON-TRANSITORY STORAGE MEDIUM AND ELECTRONIC DEVICE

CROSS-REFERENCING OF RELEVANT APPLICATIONS

This application is a continuation of International application No. PCT/CN2022/078816, filed Mar. 2, 2022, which claims priority to Chinese patent application No. 202110357477.5, filed Apr. 1, 2021, both of which are herein incorporated by reference in their entireties.

TECHNICAL FIELD

Embodiments of the present disclosure relate to the technical field of electronic devices, and in particular to an image processing method, a non-transitory storage medium and an electronic device.

BACKGROUND

With the rapid development of science and technology, the functions of electronic devices are becoming more and more powerful. Electronic devices such as Video Decoder (VDEC) may decode video images. At the time of decoding one frame of a video, data of several decoded frames of the video is generally referenced.

SUMMARY

The embodiments of the present disclosure provides an image processing method, a non-transitory storage medium and an electronic device.

In a first aspect, an embodiment of the present disclosure provides an image processing method, for use in an electronic device including a video decoder. In the method, a video bitstream is acquired, and an initial frame rate of the video bitstream is determined. A target frame rate is determined according to a power consumption constraint instruction. To-be-decoded image frames are determined in a group of pictures of the video bitstream, according to the initial frame rate and the target frame rate. A working state of the video decoder is dynamically adjusted according to a decoding order of the to-be-decoded image frames in the group of pictures, and the to-be-decoded image frames are decoded by the video decoder based on the adjusted working state.

In a second aspect, an embodiment of the present disclosure provides a non-transitory storage medium storing a computer program therein. The computer program, when running on a computer, causes the computer to: acquire a video bitstream, and determine an initial frame rate of the video bitstream; determine a target frame rate according to a power consumption constraint instruction; determine to-be-decoded image frames in a group of pictures of the video bitstream, according to the initial frame rate and the target frame rate; and dynamically adjust a working state of the video decoder according to a decoding order of the to-be-decoded image frames in the group of pictures, and decode the to-be-decoded image frames by the video decoder based on the adjusted working state.

In a third aspect, an embodiment of the present disclosure provides an electronic device including a memory, a processor and a video decoder. The memory stores multiple instructions. The processer loads the instructions in the memory to perform operations of: determining an initial frame rate of an acquired video bitstream; determining a target frame rate according to a power consumption constraint instruction; determining to-be-decoded image frames in a group of pictures of the video bitstream, according to the initial frame rate and the target frame rate; and dynamically adjusting a working state of the video decoder according to a decoding order of the to-be-decoded image frames in the group of pictures, and decoding the to-be-decoded image frames by the video decoder based on the adjusted working state.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to provide clearer explanation of the technical solutions in the embodiments of the present disclosure, a brief introduction is given in the following to the accompanying drawings required in the description of the embodiments. It is evident that the accompanying drawings in the following description are only some embodiments of the present disclosure. For those skilled in the art, other accompanying drawings can be obtained based on these drawings without any creative effort

DETAILED DESCRIPTION OF EMBODIMENTS

Figure 1:
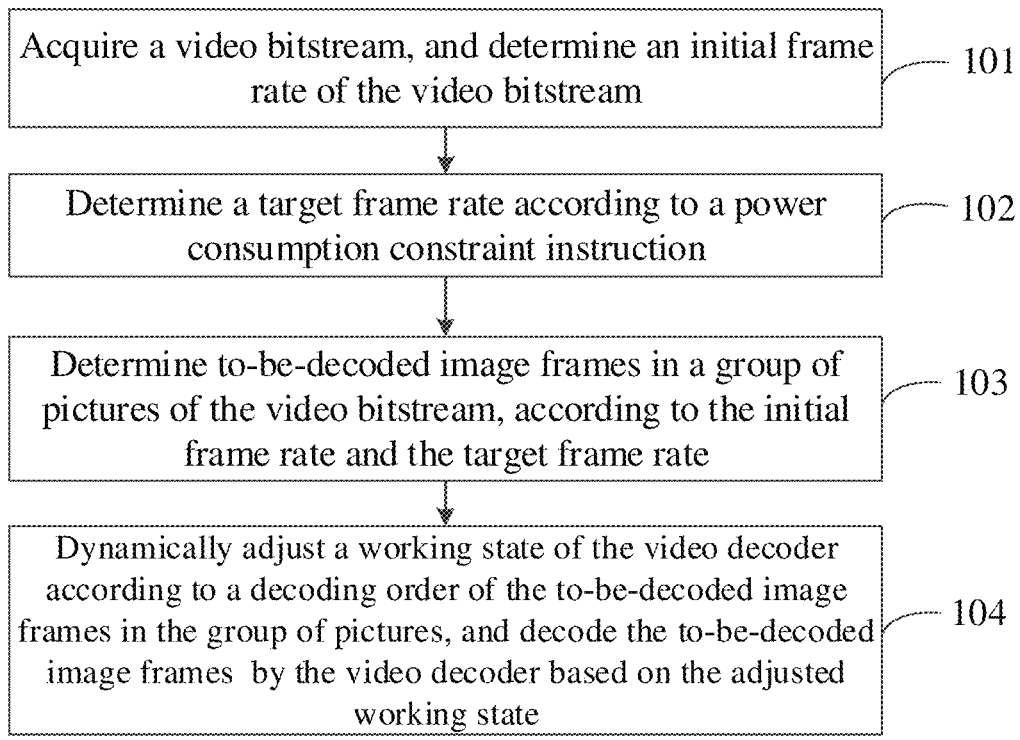
FIG. 1 is a schematic flowchart of an image processing method as provided in an embodiment of the present disclosure.

In the drawings, the same reference symbols represent same components, and the principle of the present disclosure is illustrated by taking a case where it is implemented in an appropriate computing environment as an example. The following descriptions are based on the illustrated specific embodiments of the present disclosure, which shall not be considered as limiting other embodiments not detailed herein.

In the following description, specific embodiments of the present disclosure will be described with reference to operations and symbols executed by one or more computers, unless otherwise specified. Therefore, it would mention several times that these blocks and operations are implemented by a computer. The implementation by a computer referred to herein includes operations of processing data and electronic signals by a computer processing unit in a structured form. The operations convert the data or maintain the data in the computer's memory system, which data may be reconfigured or otherwise adopt a manner that is well known to those skilled in the art, to change the operations of the computer. The data structure maintained for the data is at a physical location of the memory, which has a specific characteristic defined by the format of the data. However, the principle of the present disclosure being illustrated by the above wordings does not represent a limitation. Those testers in the art may understand that various blocks and operations described below may further be implemented in hardware.

The terms "first", "second" and "third" in the present disclosure are used to distinguish different objects, rather than describing a specific order. Furthermore, terms "include" and "have" and any variations thereof are intended to cover a non-exclusive inclusion. For example, a process, method, system, product or device that includes a series of blocks or modules is not limited to the listed blocks or modules, and some embodiments further include blocks or modules that are not listed, or some embodiments further include other blocks or modules inherent to such process, method, product or device.

An embodiment of the present disclosure provides an image processing method, applied to an electronic device. The electronic device includes a video decoder, and the method includes:

acquiring a video bitstream, and determining an initial frame rate of the video bitstream;

determining a target frame rate according to a power consumption constraint instruction;

determining to-be-decoded image frames in a group of pictures of the video bitstream, according to the initial frame rate and the target frame rate; and dynamically adjusting a working state of the video decoder according to a decoding order of the to-be-decoded image frames in the group of pictures, and decoding the to-be-decoded image frames by the video decoder based on the adjusted working state.

In some embodiments, after acquiring the video bitstream and determining the initial frame rate of the video bitstream, the method further includes:

in response to receiving no power consumption constraint instruction, acquiring a refresh rate of a screen of the electronic device; and determining the target frame rate, according to the refresh rate of the screen and the initial frame rate of the video bitstream.

In some embodiments, the determining the to-be-decoded image frames in the group of pictures of the video bitstream according to the initial frame rate and the target frame rate includes:

determining a key image frame in the group of pictures of the video bitstream, according to the initial frame rate and the target frame rate;

acquiring a decoding dependency relationship of the group of pictures; and determining, according to the decoding dependency relationship, a reference image frame referenced by the key image frame, and determining the to-be-decoded image frames according to the key image frame and the reference image frame of the key image frame.

In some embodiments, the working state of the video decoder includes an on state and an off state, and the dynamically adjusting the working state of the video decoder according to the decoding order of the to-be-decoded image frames in the group of pictures and decoding the to-be-decoded image frames by the video decoder based on the adjusted working state includes:

calculating a decoding unit time for the group of pictures, according to the target frame rate;

determining the number of to-be-decoded image frames in each decoding unit time, according to the decoding order of the to-be-decoded image frames in the group of pictures;

dividing each decoding unit time into a first time period and a second time period, according to the number of the to-be-decoded image frames in the decoding unit time;

adjusting the video decoder to be in the off state during the first time period; and adjusting the video decoder to be in the on state during the second time period, and decoding, during the second time period, the to-be-decoded image frames of the determined number in each decoding unit time.

In some embodiments, the working state of the video decoder includes a voltage strength, and the dynamically adjusting the working state of the video decoder according to the decoding order of the to-be-decoded image frames in the group of pictures and decoding the to-be-decoded image frames by the video decoder based on the adjusted working state includes:

calculating a decoding unit time for the group of pictures, according to the target frame rate;

determining the number of the to-be-decoded image frames in each decoding unit time, according to the decoding order of the to-be-decoded image frames in the group of pictures;

adjusting a working voltage of the video decoder, according to the number of the to-be-decoded image frames in each decoding unit time;

decoding, within each decoding unit time, the to-be-decoded image frames of the determined number in the decoding unit time with the adjusted working voltage of the video decoder.

In some embodiments, the decoding the to-be-decoded image frame includes:

acquiring a reference motion vector, according to the video bitstream;

acquiring, according to the reference motion vector, a corresponding reference block from an image frame of the video bitstream; and decoding a to-be-decoded block of the to-be-decoded image frame, according to the reference block.

In some embodiments, the method further includes:

acquiring a current battery level of the electronic device;

in response to the battery level being less than a preset value, generating the power consumption constraint instruction according to the battery level.

In some embodiments, the acquiring the reference motion vector according to the video bitstream includes:

performing entropy decoding on the video bitstream to obtain one or more motion vector differences, and obtaining one or more reference motion vectors, according to the one or more motion vector differences and a corresponding motion vector prediction value.

In some embodiments, the determining the to-be-decoded image frames in the group of pictures of the video bitstream according to the initial frame rate and the target frame rate includes:

in response to the target frame rate being less than the initial frame rate of the video bitstream, determining the to-be-decoded image frames in the group of pictures of the video bitstream, according to the initial frame rate and the target frame rate; and in response to the target frame rate being not less than the initial frame rate of the video bitstream, controlling the video decoder to decode according to the initial frame rate of the video bitstream.

In some embodiments, the determining the target frame rate according to the refresh rate of the screen and the initial frame rate of the video bitstream includes:

in response to the refresh rate of the screen being lower than the initial frame rate of the video bitstream, setting the refresh rate of the screen as the target frame rate.

In some embodiments, after acquiring the video bitstream and determining the initial frame rate of the video bitstream, the method further includes:

in response to receiving no power consumption constraint instruction, or in response to the target frame rate in the received power consumption constraint instruction being equal to the initial frame rate, decoding all the image frames in the group of pictures of the video bitstream.

Referring to FIG. 1, a schematic flowchart of an image processing method as provided in an embodiment of the present disclosure is illustrated. The image processing method provided in the embodiment of the present disclosure is applied to the electronic device, and the specific flow may be as follows.

At block 101, a video bitstream is acquired, and an initial frame rate of the video bitstream is determined.

There are two international organizations that formulate video coding and decoding technology, one is "International Telecommunication Union (ITU-T)" which formulates standards of H.261, H.263, H.263+, and the other is "International Organization for Standardization (ISO)" which formulates standards of MPEG-1, MPEG-2, MPEG-4, etc. H.264 is a new digital video coding standard jointly formulated by the Joint Video Group (JVT) jointly established by two organizations. In the embodiments of the present disclosure, at the time of decoding a video, the bitstream of the video is acquired first.

After the video bitstream is acquired, the frame rate, i.e., FPS (frames Per Second) of the video bitstream is further determined. The frame rate refers to the number of frames transmitted per second, and generally speaking, it refers to the number of pictures of an animation or video per second. FPS is a measure of the amount of information used to save and display a dynamic video. The more the frames per second, the smoother the displayed action will be. A movie is played at a speed of 24 pictures per second, that is, 24 still pictures are continuously projected on the screen within one second. However, with the upgrading of technology and playback devices, videos of 30 FPS, 60 FPS and even 120 FPS have gradually appeared. Therefore, there is a high requirement for video decoding.

Figure 2:
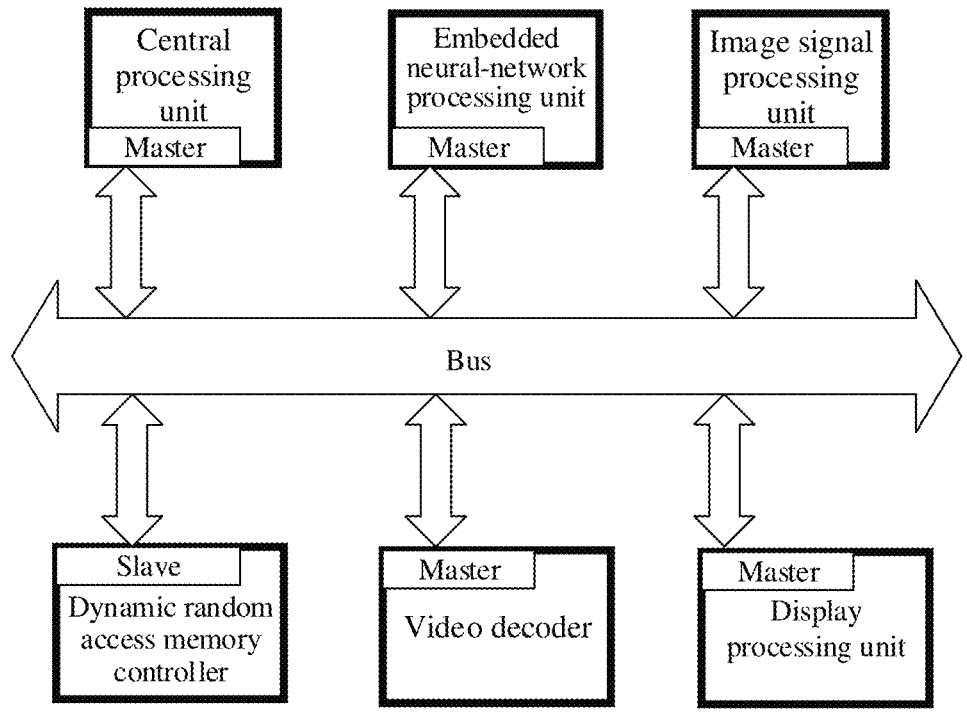
FIG. 2 is a schematic structural diagram of a video decoding system as provided in an embodiment of the present disclosure.

Referring to FIG. 2, a schematic structural diagram of a video decoding system of the related art is illustrated. In the video decoding system, a central processing unit/processor (CPU), an embedded neural-network processing unit (NPU), an image signal processing (ISP) unit, a video decoder (VDEC), and a display processing unit (DISP) read and write data from and into a DRAM through a bus and a dynamic random access memory controller (DRAMC). The central processing unit, the video decoder, and the display processing unit share bandwidth in a time-sharing mode, and the priorities of the central processing unit and the display processing unit are higher than the priority of the video encoder. It is notable that the display processing unit may or may not be provided in the video decoding system depending on specific requirements. The video decoder needs to perform motion compensation (MC) when decoding, which occupies a large bandwidth.

Figure 3:
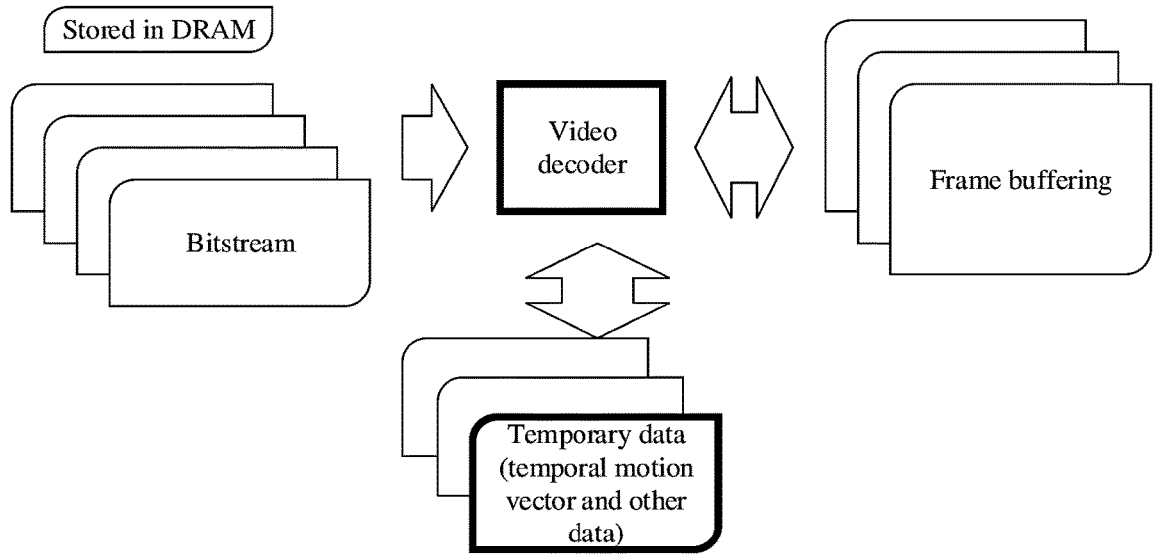
FIG. 3 is a schematic diagram illustrating storage of data of a video decoder as provided in an embodiment of the present disclosure.

Electronic devices such as the video decoder attach great importance to the cost. In terms of frame buffering, DRAM is usually used as the main storage space, in order to achieve the lowest cost and the highest production yield. Referring to FIG. 3, a schematic diagram illustrating storage of data in a video decoder in the related art is illustrated. Among them, bitstreams, to-be-buffered image frames, and temporary data are all stored in the DRAM of the video decoder. However, DRAM provides a less bandwidth. The temporary data may be temporal motion vector (TMV) and other data.

Although the video decoder may adopt an internal cache strategy of the video decoder for various video bitstreams. For example, the video bitstreams may be video bitstreams under standards such as moving picture experts group phase 1 (MPEG-1), moving picture experts group phase 2 (MPEG-2), moving picture experts group phase 4 (MPEG-4), essential video coding (MPEG-5/EVC), low bit rate video coding standard H.263 formulated by the telecommunication standardization sector of the international telecommunication union (ITU-T) for video conferencing, advanced video coding (H.264/AVC), high efficiency video coding (H.265/

HEVC), versatile video coding (H.266/VVC), video predictor 8 (VP8), video predictor 9 (VP9), and alliance for open media video 1 (AV1).

However, with the emergence of new video standards, such as H.265/HEVC, H.266/VVC, AV1, and MPEG-5, it is aimed at larger and larger picture sizes as well as higher and higher frame rates. Based on this, the bandwidth of the DRAM or the frequency of the DRAM is usually increased, to speed up the throughput of data.

In the embodiments of the present disclosure, a current video bitstream is acquired, and the video bitstream may include one or more groups of pictures (GOP), and one group of pictures includes multiple image frames. In the embodiments of the present disclosure, it is illustrated by taking a case where one group of pictures is included in the video bitstream as an example. The acquired video bitstream is an encoded video bitstream, and the image frames in the video bitstream may have not been decoded, or some image frames may have been decoded and other image frames are to be decoded. It is notable that a decoded image frame may be used as a reference image frame for decoding of other subsequent image frames.

At block 102, a target frame rate is determined according to a power consumption constraint instruction.

In the embodiments of the present disclosure, when decoding, the decoder may determine, according to the power consumption requirements, whether to reduce the frame rate of the decoded video. Specifically, in response to receiving the power consumption constraint instruction, the target frame rate corresponding to the power consumption constraint instruction may be determined. For example, the initial frame rate of the video bitstream is 120 FPS, and the electronic device receives the power consumption constraint instruction and the target frame rate corresponding to the instruction is 30 FPS, that is, the video obtained after decoding the video bitstream only needs to have a frame rate of 30 FPS, this can reduce the pressure and power consumption of the video decoder.

It is notable that, in response to receiving no power consumption constraint instruction, that is, the battery level of the electronic device is sufficient at present and there is no need to reduce the power consumption, the video decoder may be controlled to perform the normal decoding flow at the initial frame rate of the video bitstream, such as 120 FPS.

In another embodiment, after the target frame rate corresponding to the power consumption constraint instruction is determined, it may be further determined whether the target frame rate is less than the initial frame rate of the video bitstream. In response to the target frame rate being less than the initial frame rate of the video bitstream, the subsequent operations are performed to constrain the power consumption of the video decoder. In response to the target frame rate being not less than the initial frame rate of the video bitstream, the video decoder may be controlled to perform the normal decoding flow at the initial frame rate of the video bitstream. For example, in a case where the initial frame rate of the video bitstream is 60 FPS and the target frame rate corresponding to the power consumption constraint instruction is also 60 FPS, the current power consumption requirement may be met when the decoding is performed at the initial frame rate, and the normal decoding process may be performed without performing the subsequent operations. In a case where the initial frame rate of the video bitstream is 60 FPS and the target frame rate corresponding to the power consumption constraint instruction is 30 FPS which is less than the initial frame rate, it is determined that the power consumption needs to be controlled, and the subsequent operation of block 103 needs to be performed.

In some embodiments, the power consumption constraint instruction above may be automatically generated by the electronic device. For example, when the battery level of the device is less than a preset value, the power consumption constraint instruction carrying the target frame rate is automatically generated. That is, the method further includes:

acquiring a current battery level of the electronic device; and in response to the battery level being less than a preset value, generating the power consumption constraint instruction according to the battery level.

Further, after it is determined whether the battery level is less than the preset value, a corresponding target frame rate may be set according to a preset interval in which the battery level is located, to generate the power consumption constraint instruction. For example, the preset value is 30%, and three intervals of 0-10%, 11%-20%, and 21%-30% below the preset value are set for the battery level. In response to the current battery level of the electronic device being 25% which is in the interval of 21%-30%, the corresponding target frame rate may be set as 90 FPS, and a power consumption constraint instruction may be generated according to the target frame rate. In response to the current battery level of the electronic device is 18% which is in the interval of 11%-20%, the corresponding target frame rate may be set as 60 FPS, and a power consumption constraint instruction may be generated according to the target frame rate. In response to the current battery level of the electronic device being 5% which is in the interval of 0-10%, the corresponding target frame rate may be set as 30 FPS, and a power consumption constraint instruction may be generated according to the target frame rate.

At block 103, to-be-decoded image frames are determined in the group of pictures of the video bitstream, according to the initial frame rate and the target frame rate.

In the embodiments of the present disclosure, in response to the target frame rate being less than the initial frame rate, for example, when the target frame rate is 30 FPS and the initial frame rate is 120 FPS, only 30 frames per second need to be obtained after the video bitstream is decoded. In this case, some image frames in the group of pictures of the video bitstream do not need to be decoded, and the to-be-decoded image frames and those not-to-be-decoded image frames in the group of pictures need to be processed differently.

Figure 4:
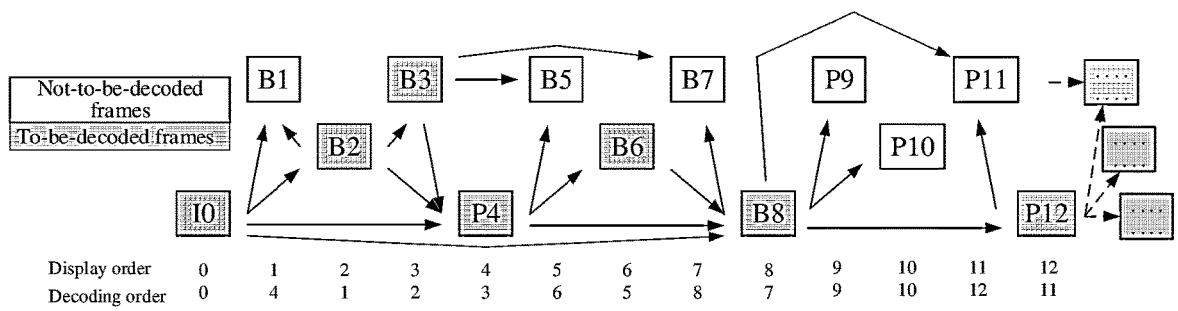
FIG. 4 is a schematic diagram illustrating reference relationships between image frames in a group of pictures as provided in an embodiment of the present disclosure.

For example, as illustrated in FIG. 4, a schematic diagram illustrating reference relationships between image frames in a group of pictures as provided in an embodiment of the present disclosure is illustrated. The embodiment is described by taking a case where one group of pictures includes 13 image frames as an example. In other implementations, the number of image frames included in the group of pictures may be adjusted according to specific requirements. In one group of pictures, the display order of the image frames may be the same as or different from the decoding order of the image frames. As illustrated in FIG. 4, the display order and the decoding order of the image frames in the group of pictures are different. It is assumed that the initial frame rate of the video bitstream is 120 FPS, that is, the time interval between I0 and B1 is $\frac{1}{120}$ seconds, the time interval between B1 and B2 is $\frac{1}{120}$ seconds, the time interval between B2 and B3 is $\frac{1}{120}$ seconds, and so on. Assuming that the VDEC may only run at 30 FPS under constraint of the power consumption or energy consumption, that is, the target frame rate is 30 FPS, it needs to decode frames that are required when the playing is performed at the frame rate of 30 FPS, that is, I0, P4, B8 and P12 illustrated in FIG. 4, and the frames that need to be played are defined as key image frames. After analyzing the bitstream, it is found that reference image frames B2, B3, B6, and B6 are needed if P4, B8, and P12 need to be decoded. In this way, the key image frames and reference image frames may be determined as the to-be-decoded image frames.

Therefore, at this block, the reference image frames of the key image frames in the group of pictures need to be determined first according to the structure of the group of pictures. Specifically, the reference image frames may be determined by analyzing the bitstream. As such, it may select which the to-be-decoded image frame the VDEC actually needs to decode, and it is not necessary to decode the not-to-be-decoded image frames. In this way, the energy consumption and power consumption of VDEC may be reduced as much as possible, so that the whole system is cooled down or the energy is continuously distributed to the most important module(s).

Specifically, the above reference image frame and the number of times the reference image frame is referenced may be determined through a preset parameter, and the preset parameter may include a network abstraction layer parsing parameter, a slice header parsing parameter, a reference image list modification parameter, a reference image frame marking parameter and the like. For example, the network abstraction layer parsing parameter may be a nal_unit( ) function, the slice header parsing parameter may be a slice_header( ) function, the reference image list modification parameter may be a ref_pic_list_modification( ) function, and the reference image frame marking parameter may be a ref_pic_list_marking( ) function.

For example, taking H.264 as an example, when rough frame-level analysis is performed, after the header information of the NAL units or the slice headers contained in multiple image frames are parsed, it may be determined which reference image frames are referred many times. For example, this may be determined in advance by means of the variable nal_ref_idc in the function nal_unit( ), the variable num_ref_idx_active_override_flag in the slice_header( ) function, the ref_pic_list_modification( ) function, and the dec_ref_pic_marking( ) function and other information.

For example, through the nal_unit( ) function, NAL units starting with 00 00 00 01 and 00 00 01 are resolved from the image frame of H.264, and then the lengths of such NAL unit are obtained directly through filling. The variable nal_ref_idc represents the reference level, which indicates a situation that the reference image frame is referenced by other image frames. The higher the reference level, the more important the reference image frame is.

The variable num_ref_idx_active_override_flag indicates whether the number of actually available reference image frames of the current image frame needs to be overridden. Syntactical elements num_ref_idx_l0_active_minus1 and num_ref_idx_l1_active_minus1 that have appeared in the image parameter set indicate the number of reference image frames actually available in the current reference image frame queue. This pair of syntactical elements may be overridden in the slice header to give more flexibility to a particular image frame. With the variable num_ref_idx_active_override_flag, the location of the slice may be known.

The ref_pic_list_modification( ) function is a modification function for the reference image list, and the function may be stored in the structure of the slice header. The ref_pic_list_modification_flag_l0 function is defined as follows: when ref_pic_list_modification_l0 is 1, the reference image list RefPicList0 is modified, and when ref_pic_list_modification_flag_l1 is 1, the reference image list RefPicList1 is modified. The dec_ref_pic_marking( ) function indicates the identifier of the decoded reference image frame, and the marking operation is used to move the reference image frame into or out of the reference image frame queue and specify the symbol of the reference image.

Continuing to referring to FIG. 4, in the embodiment, taking the H.264 video bitstream as an example, the H.264 video bitstream is roughly analyzed. Through analysis of the information of the slice header or the header information of the NAL unit, it may be determined whether some image frames are referenced and how many times they are referenced. By roughly analyzing the bitstream corresponding to these 13 image frames, the reference image list may be obtained. From the directions of the arrows illustrated in FIG. 4, the reference relationship between each image frame and other image frames may be seen, and the number of times each image frame is referenced may be seen. In a case where an image frame is referenced by other image frames once or more, the image frame may be used as a reference image frame. For example, as illustrated in FIG. 4, the number of times that frame I0 in is referenced is 4, the number of times that frame B2 with a display order of 2 is referenced is 4, the number of times that frame B3 with a display order of 3 is referenced is 2, the number of times that frame P4 with a display order of 4 is referenced is 3, the number of times that frame B6 with a display order of 6 is referenced is 1, the number of times that frame B8 with a display order of 8 is referenced is 5, the number of times that frame P12 with a display order of 12 is 4, and so on. That is, in the embodiment, it is found, after the analysis of the bitstream, that the frames that actually need to be decoded are image frames I0, B2, B3, P4, B6, B8, and P12. The remaining image frames B1, B5, B7, P9, P10, P11 and P11 are not-to-be-decoded image frames. It is notable that, in FIG. 4, only a rough frame-level analysis is performed through the relevant hardware or software of the video decoder, and the reference relationship of each specific block in the reference image frame image cannot be analyzed through the rough analysis.

At block 104, a working state of the video decoder is dynamically adjusted according to a decoding order of the to-be-decoded image frames in the group of pictures, and the to-be-decoded image frames are decoded by the video decoder based on the adjusted working state.

For example, in response to receiving the power consumption constraint instruction, and after the to-be-decoded image frames are determined according to the target frame rate of the power consumption constraint instruction, the to-be-decoded image frames may be decoded by dynamically adjusting the working state of the video decoder without processing the not-to-be-decoded image frames in the group of pictures.

Figure 5:
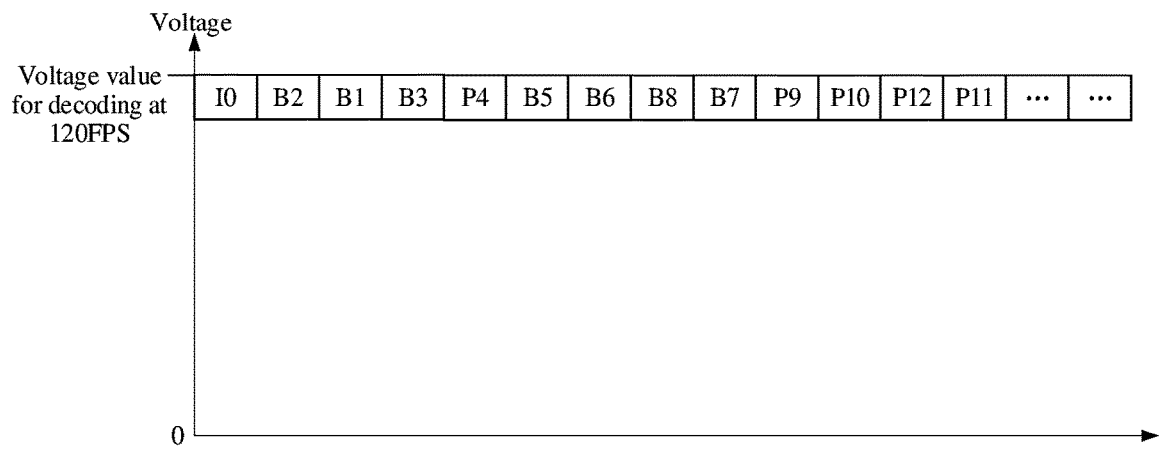
FIG. 5 is a schematic diagram illustrating decoding of a group of pictures performed without power consumption constraint as provided in an embodiment of the present disclosure.

It is notable that, in response to receiving no power consumption constraint instruction, or in response to the target frame rate in the power consumption constraint instruction being equal to the initial frame rate, all the image frames of the group of pictures in the video bitstream may be decoded. Referring to FIG. 5, a schematic diagram illustrating decoding of a group of pictures performed without power consumption constraint as provided in an embodiment of the present disclosure is illustrated. In the embodiment, the power consumption constraint instruction is not received, that is, the current battery level of the electronic device is sufficient and there is no need to reduce the frame rate to reduce the power consumption, all the image frames in the group of pictures may be decoded at the time of decoding the to-be-decoded blocks. In FIG. 5, the initial frame rate of the video bitstream is 120 FPS, and each image frame in the group of pictures may be displayed; in this case, the VDEC would strive to decode each image frame and send the decoded image frame to the screen of the electronic device for display. That is, the voltage of the video decoder is maintained at a voltage value required for decoding at the frame rate of 120 FPS, until all the image frames in the group of pictures are decoded.

Figure 6:
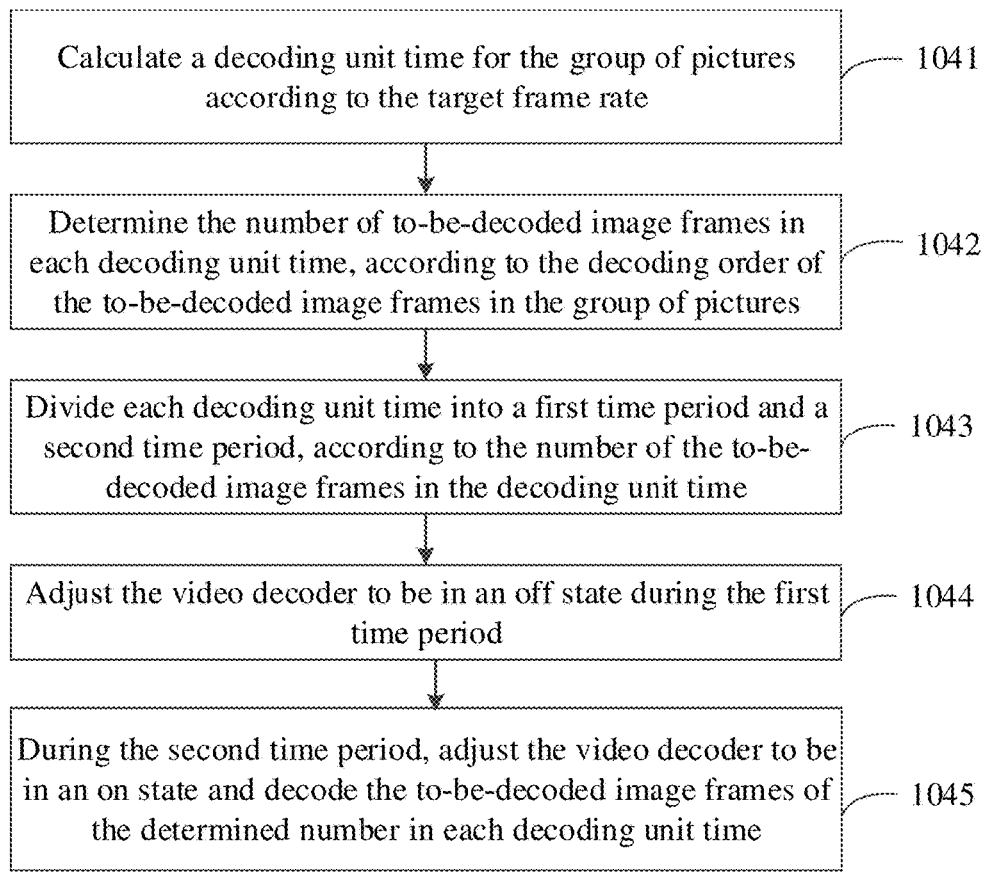
FIG. 6 is a schematic flowchart of adjusting a state of the decoder for decoding as provided in an embodiment of the present disclosure.

In some embodiments, the working state of the video decoder above may include an on state and an off state. Referring to FIG. 6, a schematic flowchart of adjusting the state of the decoder for decoding as provided in an embodiment of the present disclosure is illustrated. In the embodiment, the above block 104 may include the following blocks.

At block 1041, a decoding unit time is calculated, according to the target frame rate, for the group of pictures.

Figure 7:
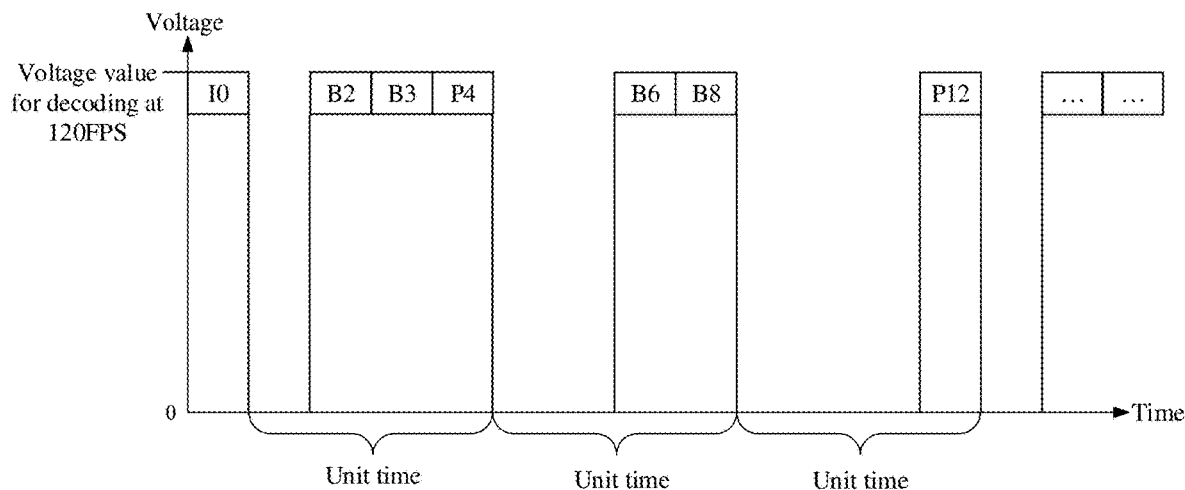
FIG. 7 is a first schematic diagram illustrating decoding of a group of pictures performed with power consumption constraint, as provided in an embodiment of the present disclosure.

In the embodiments of the present disclosure, the above decoding unit time is calculated according to the target frame rate. For example, when the initial frame rate of the video bitstream is 120 FPS and the target frame rate is 30 FPS, the decoding unit time for the group of pictures may be determined as $1/30$ seconds. Referring to FIG. 7, a first schematic diagram illustrating decoding of a group of pictures performed with power consumption constraint as provided in an embodiment of the present disclosure is illustrated. In the embodiment, frame I0 is the first to-be-decoded image frame and no reference image frame is needed therefor, the decoding unit time may be calculated after frame I0 is decoded.

At block 1042, the number of to-be-decoded image frames in each decoding unit time is determined according to the decoding order of the to-be-decoded image frames in the group of pictures.

As illustrated in FIG. 7, within a first decoding unit time after frame I0 is decoded, that is, within $1/30$ seconds, there are three to-be-decoded image frames, which are B2, B3, and P4. Within a second decoding unit time of $1/30$ seconds, there are two to-be-decoded image frames, which are B6 and B8. Within a third decoding unit time of $1/30$ seconds, there is one to-be-decoded image frame P12, and so on.

At block 1043, each decoding unit time is divided into a first time period and a second time period, according to the number of the to-be-decoded image frames in the decoding unit time.

For example, in the above first decoding unit time, since there are three to-be-decoded image frames, the $1/30$ seconds may be divided into first $1/120$ seconds and last $3/120$ seconds. In the second decoding unit time, since there are two to-be-decoded image frames, the $1/30$ seconds may be divided into first $2/120$ seconds and last $2/120$ seconds. In the third decoding unit time, since there is one to-be-decoded image frame, the $1/30$th seconds may be divided into first $3/120$ seconds and last $1/120$ second, and so on.

At block 1044, the video decoder is adjusted to be in the off state during the first time period.

At block 1045, the video decoder is adjusted to be in the on state during the second time period, and the to-be-decoded image frames of the determined number in each decoding unit time are decoded during the second time period.

In the embodiment, for example, during the first time period, i.e., the first $1/120$ seconds, the video decoder does not need to work, and the power supply therefor may be turned off; and at this time, the voltage of the video decoder is 0. During the second time period, i.e., the last $3/120$ seconds, the video decoder needs to decode frames B2, B3, and P4; and at that time, the video decoder is turned on, and the voltage of the video decoder is set to the voltage value required for decoding at the frame rate of 120 FPS until this decoding unit time ends. Thereafter, the decoding process in the next decoding unit time is started.

Figure 8:
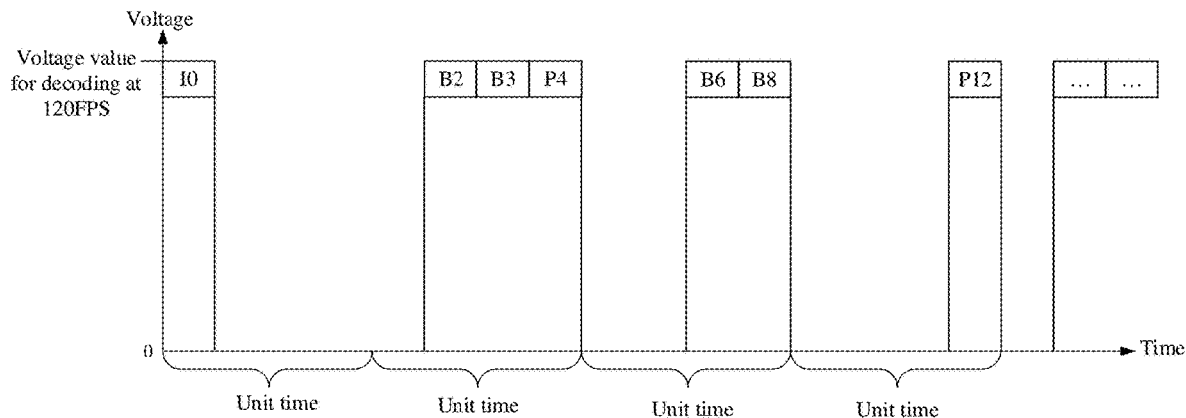
FIG. 8 is a second schematic diagram illustrating decoding of the group of pictures performed with power consumption constraint as provided in an embodiment of the present disclosure.

In another embodiment of the present disclosure, as illustrated in FIG. 8, a second schematic diagram illustrating decoding of the group of pictures performed with power consumption constraint as provided in an embodiment of the present disclosure is illustrated. After the decoding unit time for the group of pictures is determined as $1/30$ seconds, the decoding unit time may be calculated before the decoding of frame I0. Therefore, in the embodiment, within the first decoding unit time of $1/30$ seconds, there is one to-be-decoded image frame, which is I0. In the second decoding unit time of $1/30$ seconds, there are three to-be-decoded image frames, which are B2, B3, and P4. In the third decoding unit time of $1/30$ seconds, there are two to-be-decoded image frames, which are B6 and B8. In the fourth decoding unit time of $1/30$ seconds, there is one to-be-decoded image frame P12, and so on. Subsequent divisions of the first time period and the second time period may refer to the above blocks, which are not repeated here.

Figure 9:
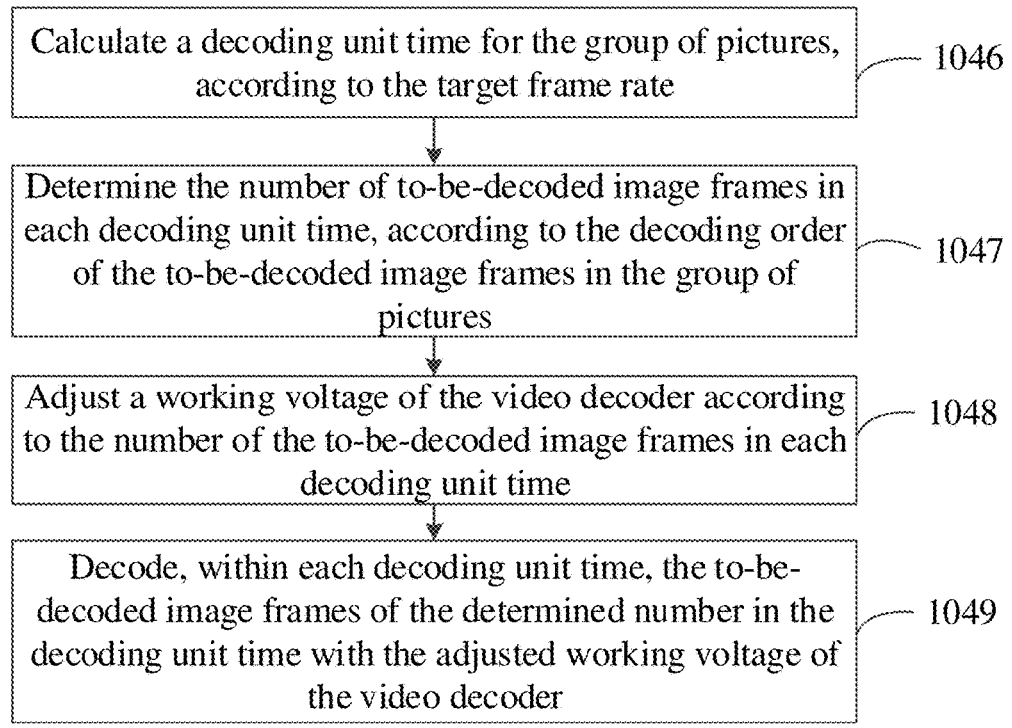
FIG. 9 is another schematic flowchart of adjusting a decoder state for decoding as provided in an embodiment of the present disclosure.

In other embodiments of the disclosure, the working state of the video decoder may include a voltage strength. For example, the voltage strength of the video decoder is adjusted to a voltage value for decoding at a frame rate of 120 FPS, or a voltage value for decoding at a frame rate of 90 FPS, or a voltage value for decoding at a frame rate of 60 FPS, or a voltage value for decoding a frame rate of 30 FPS, and so on. Referring to FIG. 9, a schematic flowchart of adjusting the state of the decoder for decoding as provided in an embodiment of the present disclosure is illustrated. In the embodiment, the above block 104 may include the following blocks.

At block 1046, a decoding unit time for the group of pictures is calculated according to the target frame rate.

Figure 10:
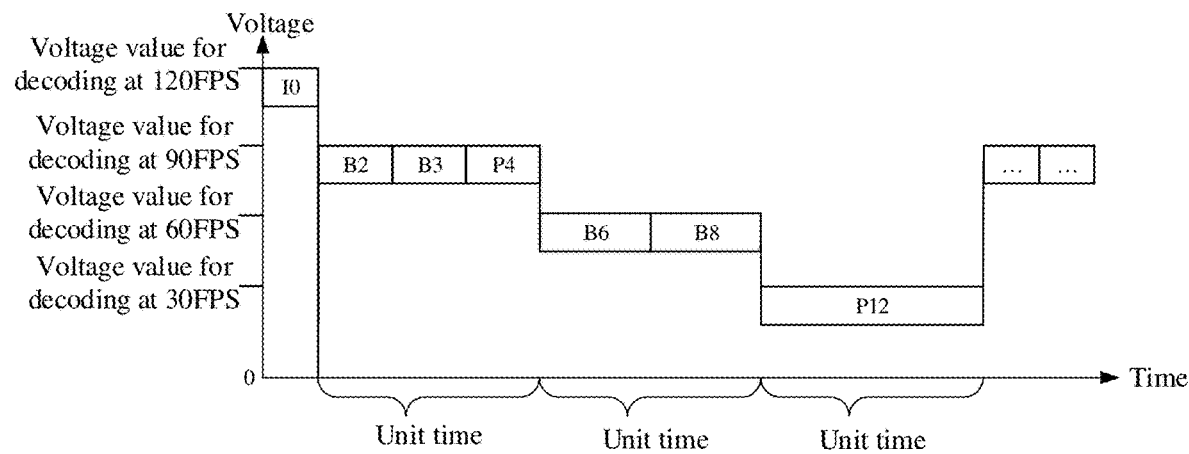
FIG. 10 is a third schematic diagram illustrating decoding of the group of pictures performed with power consumption constraint as provided in an embodiment of the present disclosure.

In the embodiment of the present disclosure, the above decoding unit time is calculated according to the target frame rate. For example, when the initial frame rate of the video bitstream is 120 FPS and the target frame rate is 30 FPS, it may be determined that the decoding unit time for the group of pictures is $1/30$ seconds. Referring to FIG. 10, a third schematic diagram illustrating decoding of the group of pictures performed with power consumption constraint as provided in an embodiment of the present disclosure is illustrated. In the embodiment, frame I0 is the first to-be-decoded image frame and no reference image frame is needed therefor, the decoding unit time may be calculated after frame I0 is decoded.

At block 1047, the number of the to-be-decoded image frames in each decoding unit time is determined according to the decoding order of the to-be-decoded image frames in the group of pictures.

As illustrated in FIG. 10, within the first decoding unit time after frame I0 is decoded, that is, within $1/30$ seconds, there are three to-be-decoded image frames, which are B2, B3 and P4. Within a second decoding unit time of $1/30$ seconds, there are two to-be-decoded image frames, which are B6 and B8. Within a second decoding unit time of $1/30$ seconds, there is one to-be-decoded image frame, and so on.

At block 1048, a working voltage of the video decoder is adjusted according to the number of the to-be-decoded image frames in each decoding unit time.

For example, in FIG. 10, during the first decoding unit time after frame I0 is decoded, since there are three to-be-decoded image frames, the working voltage of the video decoder in this decoding unit time may be set to a voltage value for decoding at the frame rate of 90 FPS. In the second decoding unit time, since there are two to-be-decoded image frames, the working voltage of the video decoder in this decoding unit time may be set to a voltage value for decoding at the frame rate of 60 FPS. In the third decoding unit time, since there is one to-be-decoded image frame, the working voltage of the video decoder in this decoding unit time may be set to a voltage value for decoding at the frame rate of 30 FPS, and so on.

At block 1049, in each decoding unit time, the to-be-decoded image frames of the determined number in the decoding unit time are decoded with the working voltage of the video decoder.

Specifically, in the first decoding unit time, the video decoder works at the voltage value for decoding at the frame rate of 90 FPS, and decodes B2, B3, and P4. In the second decoding unit time, the video decoder works at the voltage value for decoding at the frame rate of 60 FPS, and decodes B6 and B8. In the third decoding unit time, the video decoder works at the voltage value for decoding at the frame rate of 30 FPS, and decodes P12, and so on.

Figure 11:
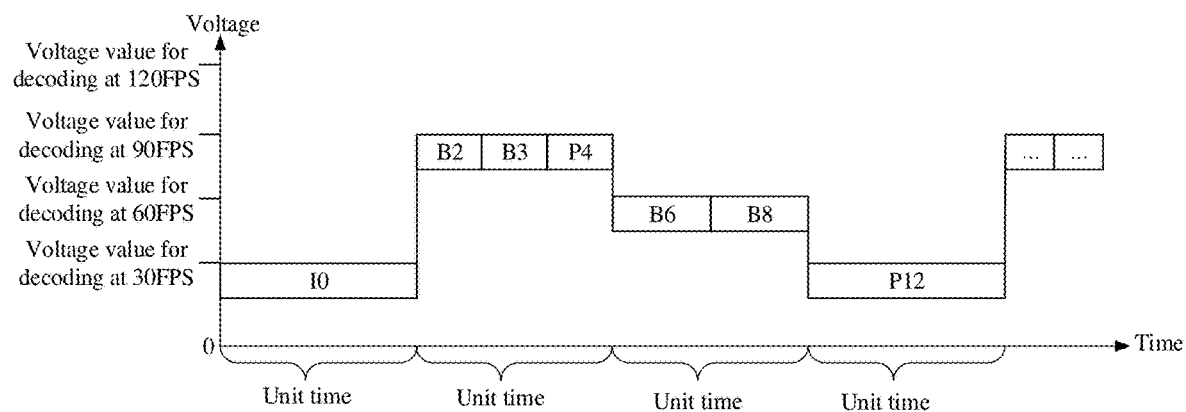
FIG. 11 is a fourth schematic diagram illustrating decoding of the group of pictures performed with power consumption constraint as provided in an embodiment of the present disclosure.

In another embodiment of the present disclosure, as illustrated in FIG. 11, a fourth schematic diagram illustrating decoding of the group of pictures performed with power consumption constraint as provided in an embodiment of the present disclosure is illustrated. After the decoding unit time for the group of pictures is determined as $\frac{1}{30}$ seconds, the decoding unit time may be calculated before the decoding of frame I0. Therefore, in the embodiment, within the first decoding unit time of $\frac{1}{30}$ seconds, there is one to-be-decoded image frame, which is I0. In the second decoding unit time of $\frac{1}{30}$ seconds, there are three to-be-decoded image frames, which are B2, B3, and P4. In the third decoding unit time of $\frac{1}{30}$ seconds, there are two to-be-decoded image frames, which are B6 and B8. In the fourth decoding unit time of $\frac{1}{30}$ seconds, there is one to-be-decoded image frame P12, and so on. For subsequent operations of adjusting, according to the number of the to-be-decoded image frames in each decoding unit time, the working voltage of the video decoder to perform the decoding, reference may be made to the above contents, which are not repeated here.

As can be seen from the above, in the image processing method provided in the embodiments of the present disclosure, the video bitstream is acquired, and the initial frame rate of the video bitstream is determined. The target frame rate is determined according to the power consumption constraint instruction. The to-be-decoded image frames in the group of pictures of the video bitstream are determined according to the initial frame rate and the target frame rate. The working state of the video decoder is dynamically adjusted according to the decoding order of the to-be-decoded image frames in the group of pictures, and the to-be-decoded image frames are decoded by the video decoder based on the adjusted working state. In the embodiments, when the power consumption is constrained, the to-be-decoded image frames are selected according to the target frame rate, and the to-be-decoded image frames are decoded by dynamically adjusting the working state of the video decoder, thereby reducing the power consumption of the electronic device.

Figure 12:
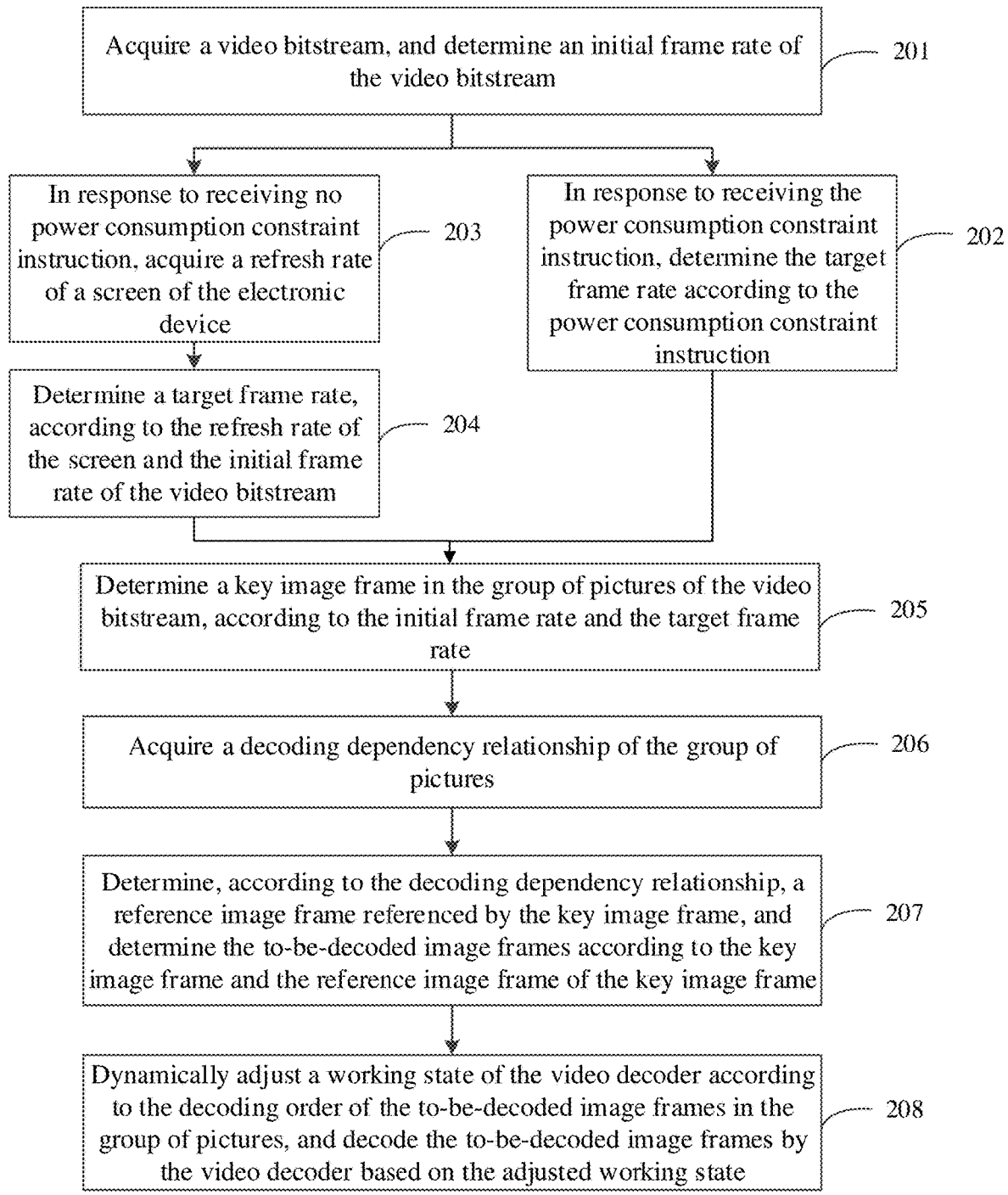
FIG. 12 is another schematic flowchart of the image processing method as provided in an embodiment of the present disclosure.

Based on the methods described in the above embodiments, the image processing method of the present disclosure is further introduced. Referring to FIG. 12, another schematic flowchart of the image processing method as provided in the embodiments of the present disclosure is illustrated, and the image processing method includes operations as follows.

At block 201, a video bitstream is acquired, and an initial frame rate of the video bitstream is determined.

In the embodiments of the present disclosure, a current video bitstream is acquired, and the video bitstream may include one or more groups of pictures (GOP), and one group of pictures includes multiple image frames. In the embodiments of the present disclosure, it is illustrated by taking a case where the video bitstream includes one group of pictures as an example. The acquired video bitstream is an encoded video bitstream, and the image frames in the video bitstream may have not been decoded, or some image frames may have been decoded and others are to be decoded. It is notable that a decoded image frame may be used as a reference image frame for decoding of other subsequent image frames.

After the video bitstream is acquired, the frame rate, i.e. FPS, of the video bitstream is further determined, which may be for example 30 FPS, 60 FPS, or even 120 FPS.

At block 202, in response to a power consumption constraint instruction being received, a target frame rate is determined according to the power consumption constraint instruction.

In the embodiments of the present disclosure, when the decoder is decoding, it may be determined, according to the power consumption requirements, whether to reduce the frame rate of the decoded video. Specifically, in response to receiving the power consumption constraint instruction, the target frame rate corresponding to the power consumption constraint instruction may be determined. For example, the initial frame rate of the video bitstream is 120 FPS, the electronic device receives the power consumption constraint instruction and the target frame rate corresponding to the instruction is 30 FPS. That is, the video obtained after decoding the video bitstream only needs to have a frame rate of 30 FPS, this can reduce the pressure and the power consumption of the video decoder.

At block 203, in response to receiving no power consumption constraint instruction, a refresh rate of a screen of the electronic device is acquired.

In an embodiment, in the case where no power consumption constraint instruction is received, if the frame rate of the decoded video is greater than the refresh rate of the screen of the electronic device, waste of resources would be caused and the power consumption of the video decoder is increased. For example, the initial frame rate of the video bitstream is 120 FPS, and the refresh rate of the screen of the electronic device is only 60 FPS. In this case, even if the battery level of the electronic device is sufficient and there is no need to constrain the power consumption, that is, no power consumption constraint instruction is received, the current refresh rate cannot meet the playback requirements of the frame rate of 120 FPS for the video. Thus, the target frame rate may be determined according to the refresh rate of the screen of the electronic device.

The refresh rate of the screen of the electronic device may be obtained by calling screen parameters of the electronic device. In addition to the refresh rate of the screen, the above screen parameters of the electronic device may further include resolution, brightness, standard Red Green Blue (sRGB) color gamut, NTSC color gamut, Pixels Per Inch (PPI, pixel density), and so on.

At block 204, the target frame rate is determined according to the refresh rate of the screen and the initial frame rate of the video bitstream.

Specifically, when the refresh rate of the screen is lower than the initial frame rate of the video bitstream, the refresh rate of the screen may be set as the target frame rate. For example, when the initial frame rate of the video bitstream is 120 FPS, and the refresh rate of the screen of the electronic device is 60 FPS, in response to receiving no power consumption constraint instruction, 60 FPS may be set as the target frame rate.

At block 205, a key image frame in the group of pictures of the video bitstream is determined according to the initial frame rate and the target frame rate.

In the embodiments of the present disclosure, in to the case where the target frame rate is less than the initial frame rate, for example, the target frame rate is 30 FPS and the initial frame rate is 120 FPS, only 30 frames per second needs to be obtained after the video bitstream is decoded. Therefore, some image frames in the group of pictures of the video bitstream do not need to be decoded, and the to-be-decoded image frames and the not-to-be-decoded image frames in the group of pictures need to be processed differently.

At this block, the to-be-played key image frames need to be determined first. Continue to referring to FIG. 4, assuming that VDEC is allowed to run only at 30 FPS under constraint of the power consumption or energy consumption, that is, the target frame rate is 30 FPS, it needs to decode the key image frames that are required when the playing is performed at 30 FPS, that is, I0, P4, B8 and P12 illustrated in the figure.

At block 206, a decoding dependency relationship of the group of pictures is acquired.

In practice, it is found, through analysis of the bitstream, that frames B2, B3 and B6 need to be referred to if the above frames P4, B8, and P12 need to be decoded. Thus, the decoding dependency relationship of the group of pictures need to be acquired first.

At block 207, a reference image frame referenced by the key image frame is determined according to the decoding dependency relationship, and the to-be-decoded image frames are determined according to the key image frame and the reference image frame of the key image frame.

The above decoding dependency relationship includes a reference relationship between each image frame and other image frames. Specifically, it may be determined, according to the decoding dependency relationship, whether the current frame is referenced by the key image frame sequentially. In response to the current frame being referenced by the key image frame, the current frame is determined as the reference image frame. In response to the current frame being not referenced by the key image frame, the current frame is determined as a not-to-be-decoded image frame. That is, the operation of determining the reference image frame referenced by the key image frame according to the decoding dependency relationship, and determining the to-be-decoded image frames according to the key image frame and the reference image frame of the key image frame includes:

determining, according to the decoding dependency relationship, whether the current frame is referenced by the key image frame;

in response to the current frame being referenced by the key image frame, determining the current frame as a reference image frame; and determining the to-be-decoded image frames, according to the key image frame and the reference image frame of the key image frame.

In an embodiment, after analysis or prediction performed by the VDEC by means of related hardware or software, it may be determined that certain image frames would be used for decoding other image frames, that is, the above decoding dependency relationship is determined. Specifically, the decoding dependency relationship of each image frame may be determined according to the frame header information of each image frame in the video bitstream. The data of each image frame may be considered as a network abstraction layer (NAL) unit. The frame header information is used to determine the beginning of one image frame. The frame header information may further be considered as header information of the NAL unit. Based on the frame header information, it may be determined which image frame is a reference image frame.

At block 208, a working state of the video decoder is dynamically adjusted according to the decoding order of the to-be-decoded image frames in the group of pictures, and the to-be-decoded image frames are decoded by the video decoder based on the adjusted working state.

For example, in the case where the power consumption constraint instruction is received, and after the to-be-decoded image frames are determined according to the target frame rate of the power consumption constraint instruction, the to-be-decoded image frames may be decoded by dynamically adjusting the working state of the video decoder, without processing the not-to-be-decoded image frames in the group of pictures.

In an embodiment, the working state of the video decoder above may include an on state and an off state. The electronic device needs to calculate, according to the target frame rate, a decoding unit time for the group of pictures, determines the number of the to-be-decoded image frames in each decoding unit time according to the decoding order of the to-be-decoded image frames in the group of pictures, and divides each decoding unit time into a first time period and a second time period according to the number of the to-be-decoded image frames in the decoding unit time. During the first time period, the video decoder is adjusted to be in the off state. During the second time period, the video decoder is adjusted to be in the on state, and the to-be-decoded image frames of the determined number in each decoding unit time are decoded.

In another embodiment, the working state of the video decoder above may include a voltage strength. For example, the voltage strength of the video decoder may be adjusted to a voltage value for decoding at the frame rate of 120 FPS, or a voltage value for decoding at the frame rate of 90 FPS, or a voltage value for decoding at the frame rate of 60 FPS, or a voltage value for decoding at the frame rate of 30 FPS, and so on. The decoding unit time for the group of pictures is calculated according to the target frame rate. The number of the to-be-decoded image frames in each decoding unit time is determined according to the decoding order of the to-be-decoded image frames in the group of pictures. The working voltage of the video decoder is adjusted according to the number of the to-be-decoded image frames in each decoding unit time. During each decoding unit time, the to-be-decoded image frames of the determined number in the decoding unit time are decoded with the working voltage of the video decoder.

In an embodiment, the operation of decoding the to-be-decoded image frame may include:

acquiring a reference motion vector according to the video bitstream;

acquiring, according to the reference motion vector, a corresponding reference block from an image frame of the video bitstream; and decoding a to-be-decoded block of the to-be-decoded image frame, according to the reference block.

Specifically, the video bitstream is analyzed, and one or more reference motion vectors may be acquired from the video bitstream, where each reference motion vector corresponds to one reference block. At the time of decoding a to-be-decoded block, a reference block needs to be referenced to. The relative displacement between the reference block and a to-be-coded block may be used as the reference motion vector. Fine analysis may be performed by obtaining the reference block corresponding to the reference motion vector. Finally, the to-be-decoded block is decoded according to image data of the reference block.

Entropy decoding may be performed on the video bitstream to obtain one or more motion vector differences (MVD). Then, one or more reference motion vectors may be obtained according to the one or more motion vector differences and a corresponding motion vector prediction value. For example, after one or more motion vector differences are obtained by performing the entropy decoding on the video bitstream, one or more reference motion vectors may be obtained according to the one or more motion vector differences and the corresponding motion vector prediction value. For example, the sum of the motion vector difference and the motion vector prediction value is used as a reference motion vector. One or more corresponding reference blocks are obtained, according to the one or more reference motion vectors, from one or more image frames of the video bitstream, and then the image data of the reference blocks required are red; thereafter, the current to-be-decoded block or a sub-block of the current to-be-decoded block is decoded according to the read image data of the reference blocks.

When the decoding is performed, the image frame may be divided into multiple blocks not overlap with each other, and these blocks define a rectangular array, where each block is a block of N×N pixels. For example, it may be a block of 4×4 pixels, a block of 32×32 pixels, a block of 128×128 pixels, and so on. At the time of decoding the to-be-decoded block in the current to-be-decoded image frame, it needs to read the image data of the required reference image frames from the memory.

Figure 13:
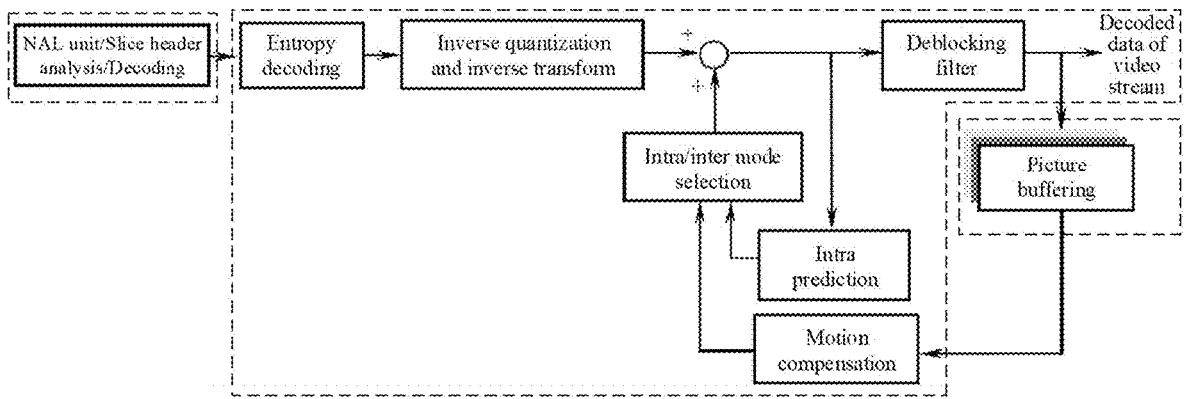
FIG. 13 is a schematic diagram illustrating decoding of a video decoder as provided in an embodiment of the present disclosure.

For example, referring to FIG. 13, a schematic diagram illustrating decoding of a video decoder as provided in an embodiment of the present disclosure is illustrated. It is illustrated by taking a case where the video bitstream is a video bitstream of H.264 as an example. After the entropy decoding is performed on the video bitstream, one or more motion vector differences and a quantized first residual are obtained. According to the motion vector difference(s) and the corresponding motion vector prediction value, the reference motion vector(s) may be obtained, so that the reference block(s) used for motion compensation may be known more precisely. The entropy decoding may be implemented by an independent hardware design, or may further be implemented in software. The analysis of the video bitstream and buffering of the images may be implemented in software through a driver program or an open media acceleration (OpenMAX) framework. After inverse quantization and inverse transformation are performed on the first residual, a second residual may be obtained. According to the reference motion vector(s) (the relative displacement(s) between the reference block(s) and the current to-be-decoded block or the sub-block of the current to-be-decoded block) and the reference block(s), the prediction value of the current to-be-decoded block or the sub-block of the current to-be-decoded block may be obtained. It is notable that the prediction value of the current to-be-decoded block or the sub-block in the current to-be-decoded block may be obtained through intra prediction or motion compensation. The inverse quantization and inverse transformation, intra/inter mode selection, intra prediction, motion compensation and deblocking filterer in the decoding process may be implemented by an application specific integrated circuit (ASIC).

After obtaining the prediction value of the current to-be-decoded block or the sub-block of the current to-be-decoded block, the second residual is added with the prediction value of the current to-be-decoded block or the sub-block of the current to-be-decoded block, to obtain a decoded block of the current to-be-decoded block or a decoded sub-block of the sub-block of the current to-be-decoded block (which is an actual value). Smooth decoded data of the video bitstream may be obtained by filtering, with the deblocking filter, the decoded block of the current to-be-decoded block or the decoded sub-block of the sub-block of the current to-be-decoded block.

If there are other to-be-decoded blocks or sub-blocks of the other to-be-decoded blocks in the current to-be-decoded image frame or the current to-be-decoded slice, the other to-be-decoded blocks or sub-blocks of the other to-be-decoded blocks are decoded. If all the to-be-decoded blocks or sub-blocks of the to-be-decoded blocks of the current to-be-decoded image frame or the current to-be-decoded slice have been decoded, other image frames or slices are decoded until all the to-be-decoded image frames or slices are decoded.

As can be seen from the above, in the image processing method provided in the embodiments of the present disclosure, the video bitstream is acquired, and the initial frame rate of the video bitstream is determined. The target frame rate is determined according to the power consumption constraint instruction. In response to receiving no power consumption constraint instruction, the refresh rate of the screen of the electronic device is acquired, and the target frame rate is determined according to the refresh rate of the screen and the initial frame rate of the video bitstream. The key image frame is determined in the group of pictures of the video bitstream, according to the initial frame rate and the target frame rate. The decoding dependency relationship of the group of pictures is acquired, and the reference image frame(s) referenced by the key image frame is determined according to the decoding dependency relationship. The to-be-decoded image frames are determined according to the key image frame and the reference image frame(s) of the key image frame. The working state of the video decoder is dynamically adjusted according to the decoding order of the to-be-decoded image frames in the group of pictures, and the to-be-decoded image frames are decoded by the video decoder based on the adjusted working state. In the embodiments of the present disclosure, when the power consumption is constrained, the to-be-decoded image frames can be selected according to the target frame rate, and the to-be-decoded image frames are decoded by dynamically adjusting the working state of the video decoder, thereby reducing the power consumption of the electronic device during the video decoding.

Figure 14:
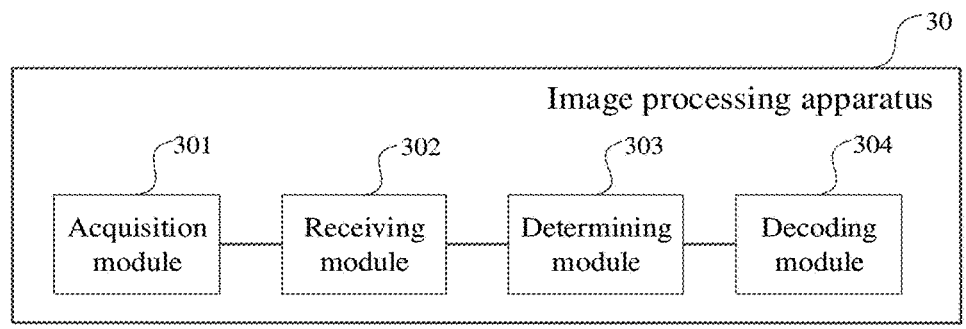
FIG. 14 is a schematic structural diagram of an image processing apparatus as provided in an embodiment of the present disclosure.

Referring to FIG. 14, a schematic structural diagram of an image processing apparatus as provided in an embodiment of the present disclosure is illustrated. The image processing apparatus 30 is applied to an electronic device, and the electronic device includes a video decoder, where the image processing apparatus 30 includes:

- an acquisition module 301, configured to acquire a video bitstream and determine an initial frame rate of the video bitstream;
- a receiving module 302, configured to determine a target frame rate according to a received power consumption constraint instruction;
- a determining module 303, configured to determine to-be-decoded image frames in a group of pictures of the video bitstream, according to the initial frame rate and the target frame rate; and
- a decoding module 304, configured to dynamically adjust a working state of the video decoder according to a decoding order of the to-be-decoded image frames in the group of pictures, and decode the to-be-decoded image frames by the video decoder based on the adjusted working state.

In an embodiment, the receiving module 302 may further be configured to, in response to receiving no power consumption constraint instruction, acquire a refresh rate of a screen of the electronic device, and determine the target frame rate according to the refresh rate of the screen and the initial frame rate of the video bitstream.

Figure 15:
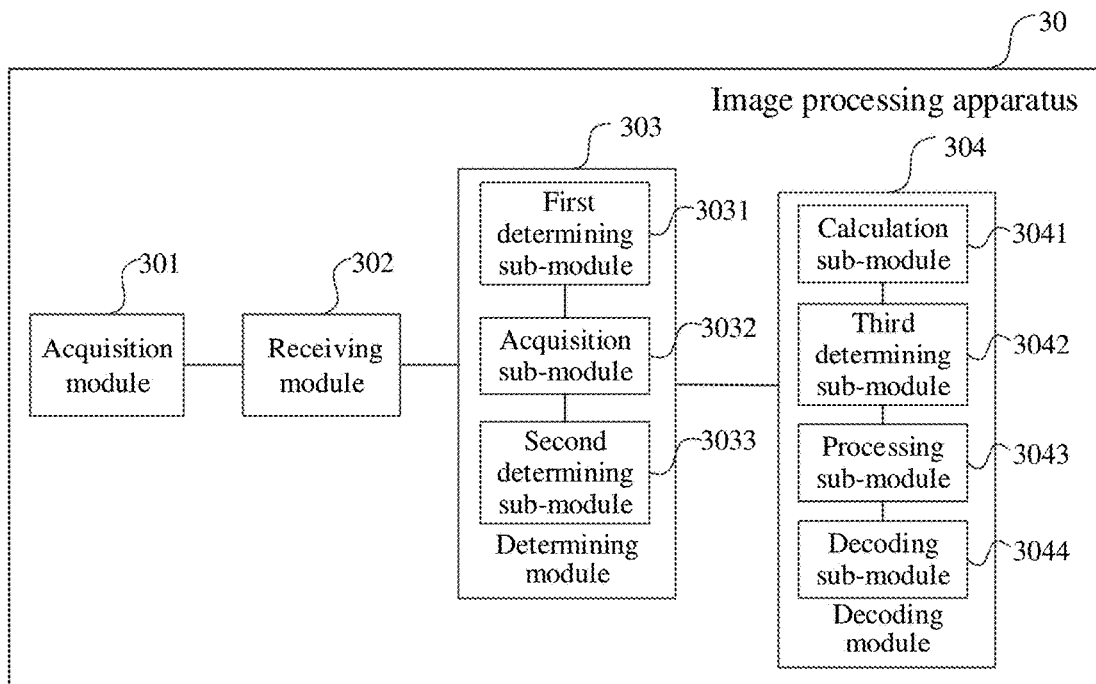
FIG. 15 is another schematic structural diagram of an image processing apparatus as provided in an embodiment of the present disclosure.

In an embodiment, referring to FIG. 15, the determining module 303 may include:

- a first determining sub-module 3031, configured to determine a key image frame in the group of pictures of the video bitstream, according to the initial frame rate and the target frame rate;
- an acquisition sub-module 3032, configured to acquire a decoding dependency relationship of the group of pictures; and
- a second determining sub-module 3033, configured to determine, according to the decoding dependency relationship, a reference image frame referenced by the key image frame, and determine the to-be-decoded image frames according to the key image frame and the reference image frame of the key image frame.

In an embodiment, the working state of the video decoder includes an on state and an off state, and the decoding module 304 may include:

- a calculation sub-module 3041, configured to calculate a decoding unit time for the group of pictures according to the target frame rate;
- a third determining sub-module 3042, configured to determine the number of the to-be-decoded image frames in each decoding unit time, according to the decoding order of the to-be-decoded image frames in the group of pictures;
- a processing sub-module 3043, configured to divide each decoding unit time into a first time period and a second time period, according to the number of the to-be-decoded images frame in the decoding unit time; and
- a decoding sub-module 3044 is configured to: adjust the video decoder to be in the off state during the first time period, and adjust the video decoder to be in the on state during the second time period, and decode the to-be-decoded image frames of the determined number in each decoding unit time.

In another embodiment, the working state of the video decoder includes a voltage strength. In this case, the processing sub-module 3043 mentioned above is further configured to adjust the working voltage of the video decoder according to the number of the to-be-decoded image frames in each decoding unit time, and the decoding sub-module 3044 is further configured to decode, within each decoding unit time, the to-be-decoded image frames of the determined number in the decoding unit time with the working voltage of the video decoder.

In an embodiment, the decoding module 304 may further be configured to: acquire a reference motion vector according to the video bitstream; acquire, according to the reference motion vector, a corresponding reference block from an image frame of the video bitstream; and decode a to-be-decoded block of the to-be-decoded image frame according to the reference block.

In an embodiment, the receiving module 302 may further be configured to acquire a current battery level of the electronic device, and in response to the battery level being less than a preset value, generate the power consumption constraint instruction according to the battery level.

In an embodiment, the decoding module 304 may further be configured to: perform entropy decoding on the video bitstream to obtain one or more motion vector differences, and obtain one or more reference motion vectors, according to the one or more motion vector differences and a corresponding motion vector prediction value.

In an embodiment, the determining module 303 may further be configured to: in response to the target frame rate being less than the initial frame rate of the video bitstream, determine the to-be-decoded image frames in the group of pictures of the video bitstream according to the initial frame rate and the target frame rate; and in response to the target frame rate being not less than the initial frame rate of the video bitstream, control the video decoder to decode according to the initial frame rate of the video bitstream.

In an embodiment, the receiving module 302 may further be configured to, in response to the refresh rate of the screen being lower than the initial frame rate of the video bitstream, set the refresh rate of the screen as the target frame rate.

In an embodiment, the decoding module 304 may further be configured to decode all image frames in the group of pictures of the video bitstream, in response to receiving no power consumption constraint instruction, or in response to the target frame rate in the received power consumption constraint instruction being equal to the initial frame rate.

As can be seen from the above, through the image processing apparatus 30 of the embodiments of the present disclosure, the video bitstream is acquired and the initial frame rate of the video bitstream is determined. The target frame rate is determined according to the power consumption constraint instruction. The to-be-decoded image frames in the group of pictures of the video bitstream are determined according to the initial frame rate and the target frame rate. The working state of the video decoder is dynamically adjusted according to the decoding order of the to-be-decoded image frames in the group of pictures, and the to-be-decoded image frames are decoded by the video decoder based on the adjusted working state. Through the embodiments of the present disclosure, when the power consumption is constrained, the to-be-decoded image frames are selected according to the target frame rate, and the to-be-decoded image frames are decoded by dynamically adjusting the working state of the video decoder, thereby reducing the power consumption of the electronic device.

In the embodiments of the present disclosure, the image processing apparatus involves the same concept as the image processing method in the above embodiments, and any method provided in the embodiments of the image processing method may be run on the image processing apparatus. The specific implementation processes of the image processing apparatus may refer to the embodiments of the image processing method, which are not repeated here.

The term "module" as used herein may be considered as a software object executing on the computing system. The different components, modules, engines and services described herein may be considered as the implementation objects on the computing system. The apparatus and method described herein may be implemented in software, and in hardware, all of which are within the protection scope of the present disclosure.

The embodiments of the present disclosure further provide a non-transitory storage medium storing a computer program thereon. The computer program, when running on a computer, causes the computer to perform the image processing method mentioned above.

For example, in some embodiments, the computer program, when running on the computer, causes the computer to:
  acquire a video bitstream, and determine an initial frame rate of the video bitstream;
  determine a target frame rate according to a power consumption constraint instruction;
  determine to-be-decoded image frames in a group of pictures of the video bitstream, according to the initial frame rate and the target frame rate; and
  dynamically adjust a working state of the video decoder according to a decoding order of the to-be-decoded image frames in the group of pictures, and decode the to-be-decoded image frames by the video decoder based on the adjusted working state.

The embodiments of the present disclosure further provide an electronic device. The electronic device includes a video decoder, such as a tablet computer, and a mobile phone. The processor in the electronic device loads instructions corresponding to the process of one or more application programs into a memory according to the following operations, and the processor runs the application programs stored in the memory to realize various functions of:
  acquiring a video bitstream, and determining an initial frame rate of the video bitstream;
  determining a target frame rate according to a power consumption constraint instruction;
  determining to-be-decoded image frames in a group of pictures of the video bitstream, according to the initial frame rate and the target frame rate; and
  dynamically adjusting a working state of the video decoder according to a decoding order of the to-be-decoded image frames in the group of pictures, and decoding the to-be-decoded image frames by the video decoder based on the adjusted working state.

Reference to "an embodiment" herein means that a particular feature, structure or characteristic described in connection with the embodiment may be included in at least one embodiment of the present disclosure. This expression appearing in various places of the specification does not necessarily refer to the same embodiment, nor is it an independent or alternative embodiment mutually exclusive with other embodiments. It is understood explicitly and implicitly by those skilled in the art that the embodiments described herein may be combined with other embodiments.

Figure 16:
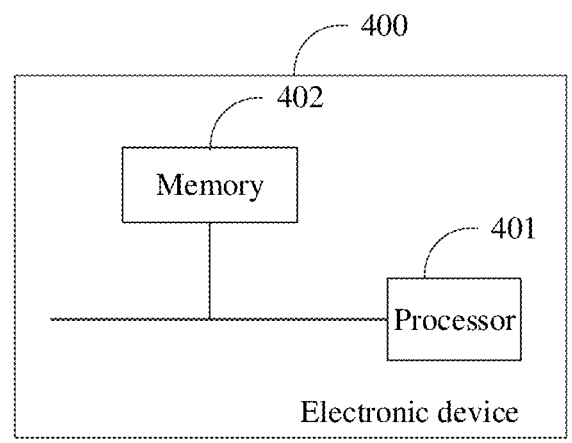
FIG. 16 is a schematic structural diagram of an electronic device as provided in an embodiment of the present disclosure.

Referring to FIG. 16, the electronic device 400 includes a processor 401 and a memory 402. The processor 401 is electrically connected to the memory 402.

The processor 400 is the control center of the electronic device 400, which connects various parts of the whole electronic device with various interfaces and lines. By running or loading computer programs stored in the memory 402 and calling data stored in the memory 402, the processor 400 executes various functions of the device 400 and process data, so as to monitor the electronic device 400 as a whole.

The memory 402 may be configured to store software programs and modules, and the processor 401 executes various functional applications and data processing by running the computer programs and modules stored in the memory 402. The memory 402 may mainly include a program storage area and a data storage area. The program storage area may store an operating system, a computer program required by at least one function (such as a sound playing function, and an image playing function), and the like. The data storage area may store data and the like created according to the use of the electronic device. In addition, the memory 402 may include a high-speed random access memory, and may further include a non-volatile memory, such as at least one magnetic disk storage device, flash memory device, or other volatile solid-state memory devices. Correspondingly, the memory 402 may further include a memory controller to provide the processor 401 with access to the memory 402.

In the embodiments of the present disclosure, the processor 401 in the electronic device 400 loads the instructions corresponding to the processes of one or more computer programs into the memory 402 according to the following operations, and the processor 401 runs the computer programs stored in the memory 402 to realize various functions of:
  acquiring a video bitstream, and determining an initial frame rate of the video bitstream;
  determining a target frame rate according to a power consumption constraint instruction;
  determining to-be-decoded image frames in a group of pictures of the video bitstream, according to the initial frame rate and the target frame rate; and
  dynamically adjusting a working state of the video decoder according to a decoding order of the to-be-decoded image frames in the group of pictures, and decoding the to-be-decoded image frames by the video decoder based on the adjusted working state.

In an embodiment, after acquiring the video bitstream and determining the initial frame rate of the video bitstream, the processor 401 may perform operations of: in response to receiving no power consumption constraint instruction, acquiring a refresh rate of a screen of the electronic device, and determining the target frame rate according to the refresh rate of the screen and the initial frame rate of the video bitstream.

In an embodiment, in determining the to-be-decoded image frames in the group of
  pictures of the video bitstream according to the initial frame rate and the target frame rate, the processor 401 may perform operations of: determining a key image frame in the group of pictures of the video bitstream, according to the initial frame rate and the target frame rate; acquiring a decoding dependency relationship of the group of pictures; and determining, according to the decoding dependency relationship, a reference image frame referenced by the key image frame, and determining the to-be-decoded image frames according to the key image frame and the reference image frame of the key image frame.

In an embodiment, the working state of the video decoder includes an on state and an off state. In dynamically adjusting the working state of the video decoder according to the decoding order of the to-be-decoded image frames in the group of pictures and decoding the to-be-decoded image frames, the processor 401 may perform operations of: calculating a decoding unit time for the group of pictures according to the target frame rate; determining the number of the to-be-decoded image frames in each decoding unit time, according to the decoding order of the to-be-decoded image frames in the group of pictures; dividing each decoding unit time into a first time period and a second time period, according to the number of the to-be-decoded image frames in the decoding unit time; adjusting the video decoder to be in the off state during the first time period; adjusting the video decoder to be in the on state during the second time period, and decoding the to-be-decoded image frames of the determined number in each decoding unit time.

In an embodiment, the working state of the video decoder includes a voltage strength, and in dynamic adjusting the working state of the video decoder according to the decoding order of the to-be-decoded image frames in the group of pictures and decoding the to-be-decoded image frames, the processor 401 may perform operations of: calculating a decoding unit time for the group of pictures according to the target frame rate; determining the number of the to-be-decoded image frames in each decoding unit time, according to the decoding order of the to-be-decoded image frames in the group of pictures; adjusting the working voltage of the video decoder according to the number of the to-be-decoded image frames in each decoding unit time; and in each decoding unit time, decoding the to-be-decoded image frames of the determined number in the decoding unit time with the adjusted working voltage of the video decoder.

In an embodiment, in decoding the to-be-decoded image frame, the processor 401 may perform operations of: acquiring a reference motion vector according to the video bitstream; acquiring, according to the reference motion vector, a corresponding reference block from an image frame of the video bitstream; and decoding a to-be-decoded block of the to-be-decoded image frame according to the reference block.

In an embodiment, the processor 401 may perform operations of: acquiring a current battery level of the electronic device; and in response to the battery level being less than a preset value, generating the power consumption constraint instruction according to the battery level.

In an embodiment, in acquiring the reference motion vector according to the video bitstream, the processor 401 may perform operations of: performing entropy decoding on the video bitstream to obtain one or more motion vector differences, and obtaining one or more reference motion vectors according to the one or more motion vector differences and a corresponding motion vector prediction value.

In an embodiment, in determining the to-be-decoded image frames in the group of pictures of the video bitstream according to the initial frame rate and the target frame rate, the processor 401 may perform operations of: in response to the target frame rate being less than the initial frame rate of the video bitstream, determining the to-be-decoded image frames in the group of pictures of the video bitstream, according to the initial frame rate and the target frame rate; and in response to the target frame rate being not less than the initial frame rate of the video bitstream, controlling the video decoder to decode according to the initial frame rate of the video bitstream.

In an embodiment, in determining the target frame rate according to the refresh rate of the screen and the initial frame rate of the video bitstream, the processor 401 may perform an operation of: in response to the refresh rate of the screen being lower than the initial frame rate of the video bitstream, setting the refresh rate of the screen as the target frame rate.

In an embodiment, after acquiring the video bitstream and determining the initial frame rate of the video bitstream, the processor 401 may perform operations of: decoding all image frames in the group of pictures of the video bitstream, in response to receiving no power consumption constraint instruction, or in response to the target frame rate in the received power consumption constraint instruction being equal to the initial frame rate.

Figure 17:
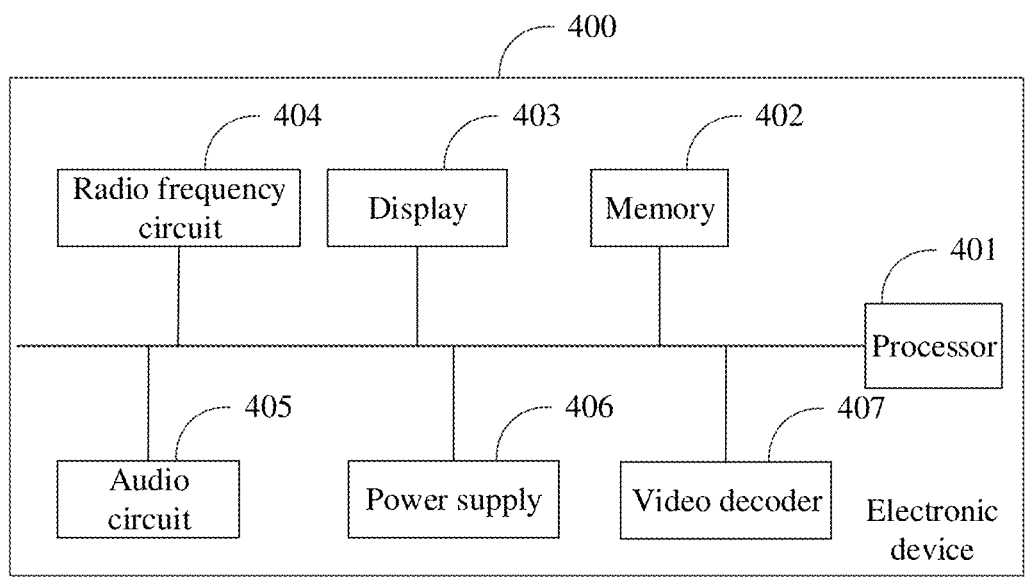
FIG. 17 is another schematic structural diagram of an electronic device as provided in an embodiment of the present disclosure.

Referring to FIG. 17, in some embodiments, the electronic device 400 may further include a display 403, a radio frequency circuit 404, an audio circuit 405, a power supply 406, and a video decoder 407. The display 403, the radio frequency circuit 404, the audio circuit 405, the power supply 406, and the video decoder 407 are all electrically connected to the processor 401.

The display 403 may be configured to display information input by or provided to a user and various graphical user interfaces, and these graphical user interfaces may be composed of graphics, text, icons, videos, and any combination thereof. The display 403 may include a display panel. In some implementations, the display panel may be configured in the form of a liquid crystal display (LCD) or an organic light-emitting diode (OLED).

The ratio frequency circuit 404 may be configured to send and receive a radio frequency signal to establish wireless communication with network devices or other electronic devices through wireless communication, and to send and receive signals with the network devices or other electronic devices. Generally, the RF circuit 501 includes, but is not limited to, an antenna, at least one amplifier, a tuner, one or more oscillators, a subscriber identity module (SIM) card, a transceiver, a coupler, a low noise amplifier (LNA), a duplexer, and the like.

The audio circuit 405 may be configured to provide an audio interface between the user and the electronic device through a speaker and microphone. The audio circuit 506 may convert the received audio data into an electrical signal and send it to the speaker, and the speaker may convert the electrical signal into an audio signal for output.

The power supply 406 may be configured to supply power to various components of the electronic device 400. In some embodiments, the power supply 406 may be logically connected with the processor 401 through a power management system, so that the functions of managing the charging, discharging and power consumption are achieved through the power management system. The power supply 406 may further include one or more DC or AC power supplies, a recharging system, a power failure detection circuit, a power converter or inverter, a power status indicator and other arbitrary components.

The video decoder 407 is a program (video player) or device that reproduces and decodes encoded digital video. For example, if a real encoder is installed in a system, files in other formats may be converted into files in the format of rm or rmvb. And if a real decoder is installed, files in the formats of rm or rmvb can be displayed. The video decoders are divided into software decoders, hardware decoders, and wireless decoders.

Although not illustrated in FIG. 17, the electronic device 400 may further include a camera, a Bluetooth module, etc., which are not described in detail here.

In the embodiments of the present disclosure, the non-transitory storage medium may be a magnetic disk, an optical disk, a read only memory (ROM), a random access memory (RAM), and the like.

In the embodiments above, the descriptions of various embodiments have their own emphases. For parts not detailed in a certain embodiment, reference may be made to relevant descriptions of other embodiments.

It is notable that, for the image processing method of the embodiments of the present disclosure, it is understandable for ordinary testers in the art that all or part of the flow of the image processing methods of the embodiments of the present disclosure may be implemented by controlling related hardware through the computer program. The computer program may be stored in a computer-readable storage medium, such as stored in the memory of the electronic device, and executed by at least one processor in the electronic device, and the execution process thereof may include the flow of the embodiments of the image processing method. The non-transitory storage medium may be the magnetic disk, the optical disk, the read-only memory and the random access memory, etc.

For the image processing apparatus of the embodiments of the present disclosure, the individual functional modules may be integrated into one processing chip, or each module may physically exist separately, or two or more modules may be integrated into one module. The integrated modules above may be realized in the form of hardware or software functional modules. When the integrated module is realized in the form of software functional modules, and sold or used as an independent product, it may further be stored in a computer-readable storage medium, such as a read-only memory, magnetic disk or optical disk.

The image processing method and apparatus, the non-transitory storage medium and the electronic device provided in the embodiments of the present disclosure are described in detail above. The principle and implementations of the present disclosure are illustrated by using specific examples. The descriptions of the above embodiments are only used to help understand the method and the core idea of the present disclosure. In addition, according to the idea of the present disclosure, variations may be made by those skilled in the art in the specific implementations and application scopes. To sum up, the contents of the specification shall not be construed as limiting the present disclosure.

What is claimed is:

1. An image processing method, for use in an electronic device comprising a video decoder, the method comprising:
    acquiring a video bitstream, and determining an initial frame rate of the video bitstream;
    determining a target frame rate according to a power consumption constraint instruction;
    determining to-be-decoded image frames in a group of pictures of the video bitstream, according to the initial frame rate and the target frame rate; and
    dynamically adjusting a working state of the video decoder according to a decoding order of the to-be-decoded image frames in the group of pictures, and decoding the to-be-decoded image frames by the video decoder based on the adjusted working state;
    wherein the working state of the video decoder comprises an on state and an off state; and
    the dynamically adjusting the working state of the video decoder according to the decoding order of the to-be-decoded image frames in the group of pictures, and decoding the to-be-decoded image frames by the video decoder based on the adjusted working state, comprises:
        calculating a decoding unit time for the group of pictures, according to the target frame rate;
        determining a number of to-be-decoded image frames in each decoding unit time, according to the decoding order of the to-be-decoded image frames in the group of pictures;
        dividing each decoding unit time into a first time period and a second time period, according to the number of the to-be-decoded image frames in the decoding unit time;
        adjusting the video decoder to be in the off state during the first time period of each decoding unit time; and
        adjusting the video decoder to be in the on state during the second time period of each decoding unit time, and decoding, during the second time period of each decoding unit time, the to-be-decoded image frames of the determined number in each decoding unit time.

2. The image processing method of claim 1, wherein after acquiring the video bitstream and determining the initial frame rate of the video bitstream, the method further comprises:
    in response to receiving no power consumption constraint instruction, acquiring a refresh rate of a screen of the electronic device; and
    determining the target frame rate, according to the refresh rate of the screen and the initial frame rate of the video bitstream.

3. The image processing method of claim 1, wherein the determining the to-be-decoded image frames in the group of pictures of the video bitstream according to the initial frame rate and the target frame rate comprises:
    determining a key image frame in the group of pictures of the video bitstream, according to the initial frame rate and the target frame rate;
    acquiring a decoding dependency relationship of the group of pictures; and
    determining, according to the decoding dependency relationship, a reference image frame referenced by the key image frame, and determining the to-be-decoded image frames according to the key image frame and the reference image frame of the key image frame.

4. The image processing method of claim 3, wherein the determining the key image frame in the group of pictures of the video bitstream, according to the initial frame rate and the target frame rate comprises:
    determining, from the group of pictures of the video bitstream, first candidate image frames that need to be decoded in case of playing at the initial frame rate; and
    determining, as key image frames, second candidate image frames from the first candidate image frames that need to be decoded in case of playing at the target frame rate.

5. The image processing method of claim 1, wherein the decoding the to-be-decoded image frame comprises:
    acquiring a reference motion vector according to the video bitstream;
    acquiring, according to the reference motion vector, a corresponding reference block from an image frame of the video bitstream; and
    decoding a to-be-decoded block of the to-be-decoded image frame, according to the reference block.

6. The image processing method of claim 1, wherein the method further comprises:
    acquiring a current battery level of the electronic device; and in response to the battery level being less than a preset value, generating the power consumption constraint instruction according to the battery level.

7. The image processing method of claim 5, wherein the acquiring the reference motion vector according to the video bitstream comprises:
performing entropy decoding on the video bitstream to obtain one or more motion vector differences, and obtaining one or more reference motion vectors according to the one or more motion vector differences and a corresponding motion vector prediction value.

8. The image processing method of claim 1, wherein the determining the to-be-decoded image frames in the group of pictures of the video bitstream according to the initial frame rate and the target frame rate comprises:
in response to the target frame rate being less than the initial frame rate of the video bitstream, determining the to-be-decoded image frames in the group of pictures of the video bitstream, according to the initial frame rate and the target frame rate; and
in response to the target frame rate being not less than the initial frame rate of the video bitstream, controlling the video decoder to decode according to the initial frame rate of the video bitstream.

9. The image processing method of claim 2, wherein the determining the target frame rate according to the refresh rate of the screen and the initial frame rate of the video bitstream comprises:
in response to the refresh rate of the screen being lower than the initial frame rate of the video bitstream, setting the refresh rate of the screen as the target frame rate.

10. The image processing method of claim 1, wherein after acquiring the video bitstream and determining the initial frame rate of the video bitstream, the method further comprises:
in response to receiving no power consumption constraint instruction, or in response to the target frame rate in the received power consumption constraint instruction being equal to the initial frame rate, decoding all the image frames in the group of pictures of the video bitstream.

11. A non-transitory storage medium storing a computer program therein, wherein the computer program, when running on a computer, cause the computer to:
acquire a video bitstream, and determine an initial frame rate of the video bitstream;
determine a target frame rate according to a power consumption constraint instruction;
determine to-be-decoded image frames in a group of pictures of the video bitstream, according to the initial frame rate and the target frame rate; and
dynamically adjust a working state of a video decoder according to a decoding order of the to-be-decoded image frames in the group of pictures, and decode the to-be-decoded image frames by the video decoder based on the adjusted working state;
wherein the working state of the video decoder comprises an on state and an off state; and
the computer program further causes the computer to:
calculate a decoding unit time for the group of pictures, according to the target frame rate;
determine a number of to-be-decoded image frames in each decoding unit time, according to the decoding order of the to-be-decoded image frames in the group of pictures;
divide each decoding unit time into a first time period and a second time period, according to the number of the to-be-decoded image frames in the decoding unit time;
adjust the video decoder to be in the off state during the first time period of each decoding unit time; and
adjust the video decoder to be in the on state during the second time period of each decoding unit time, and decode, during the second time period of each decoding unit time, the to-be-decoded image frames of the determined number in each decoding unit time.

12. An electronic device, comprising a processor, a memory and a video decoder, wherein the memory stores a plurality of instructions, and the processor loads the instructions in the memory to perform operations of:
determining an initial frame rate of an acquired video bitstream;
determining a target frame rate according to a power consumption constraint instruction;
determining to-be-decoded image frames in a group of pictures of the video bitstream, according to the initial frame rate and the target frame rate; and
dynamically adjusting a working state of the video decoder according to a decoding order of the to-be-decoded image frames in the group of pictures, and decoding the to-be-decoded image frames by the video decoder based on the adjusted working state;
wherein the working state of the video decoder comprises an on state and an off state; and
the dynamically adjusting the working state of the video decoder according to the decoding order of the to-be-decoded image frames in the group of pictures, and decoding the to-be-decoded image frames by the video decoder based on the adjusted working state, comprises:
calculating a decoding unit time for the group of pictures, according to the target frame rate;
determining a number of to-be-decoded image frames in each decoding unit time, according to the decoding order of the to-be-decoded image frames in the group of pictures;
dividing each decoding unit time into a first time period and a second time period, according to the number of the to-be-decoded image frames in the decoding unit time;
adjusting the video decoder to be in the off state during the first time period of each decoding unit time; and
adjusting the video decoder to be in the on state during the second time period of each decoding unit time, and decoding, during the second time period of each decoding unit time, the to-be-decoded image frames of the determined number in each decoding unit time.

13. The electronic device of claim 12, wherein the processor is further configured to perform operations of:
in response to receiving no power consumption constraint instruction, acquiring a refresh rate of a screen of the electronic device; and
determining the target frame rate, according to the refresh rate of the screen and the initial frame rate of the video bitstream.

14. The electronic device of claim 12, wherein the processor is further configured to perform operations of:
determining a key image frame in the group of pictures of the video bitstream, according to the initial frame rate and the target frame rate;

acquiring a decoding dependency relationship of the group of pictures; and determining, according to the decoding dependency relationship, a reference image frame referenced by the key image frame, and determining the to-be-decoded image frames according to the key image frame and the reference image frame of the key image frame.

15. The electronic device of claim 14, wherein the processor is further configured to perform operations of:

acquiring a reference motion vector according to the video bitstream;

acquiring, according to the reference motion vector, a corresponding reference block from an image frame of the video bitstream; and decoding a to-be-decoded block of the to-be-decoded image frame, according to the reference block.

16. The electronic device of claim 12, wherein the processor is further configured to perform operations of:

acquiring a current battery level of the electronic device; and in response to the battery level being less than a preset value, generating the power consumption constraint instruction according to the battery level.

17. The image processing method of claim 6, wherein the generating the power consumption constraint instruction according to the battery level, comprises:

generating the power consumption constraint instruction, with a corresponding target frame rate set according to a battery level interval in which the acquired battery level is located, wherein the target frame rate increases with an increase of a value of the battery level interval.

18. The image processing method of claim 3, wherein the reference image frame and a number of times the reference image frame is referenced are determined through a preset parameter, and the preset parameter comprises at least a network abstraction layer parsing parameter, a slice header parsing parameter, a reference image list modification parameter, and a reference image frame marking parameter.

19. The image processing method of claim 1, wherein the calculating a decoding unit time for the group of pictures according to the target frame rate, comprises:

calculating a reciprocal of the target frame rate, as the decoding unit time for the group of pictures.

20. The non-transitory storage medium of claim 11, wherein the computer program further causes the computer to:

determine, from the group of pictures of the video bitstream, first candidate image frames that need to be decoded in case of playing at the initial frame rate, and determine, as key image frames, second candidate image frames from the first candidate image frames that need to be decoded in case of playing at the target frame rate;

acquire a decoding dependency relationship of the group of pictures; and determine, according to the decoding dependency relationship, a reference image frame referenced by each of the key image frames, and determine the to-be-decoded image frames according to each of the key image frame and the reference image frame of each of the key image frame.

* * * * *